Jan. 18, 1938. C. L. OTT ET AL 2,105,841
AUTOMATIC LINE BEARING GRINDER
Filed July 28, 1932 18 Sheets-Sheet 1
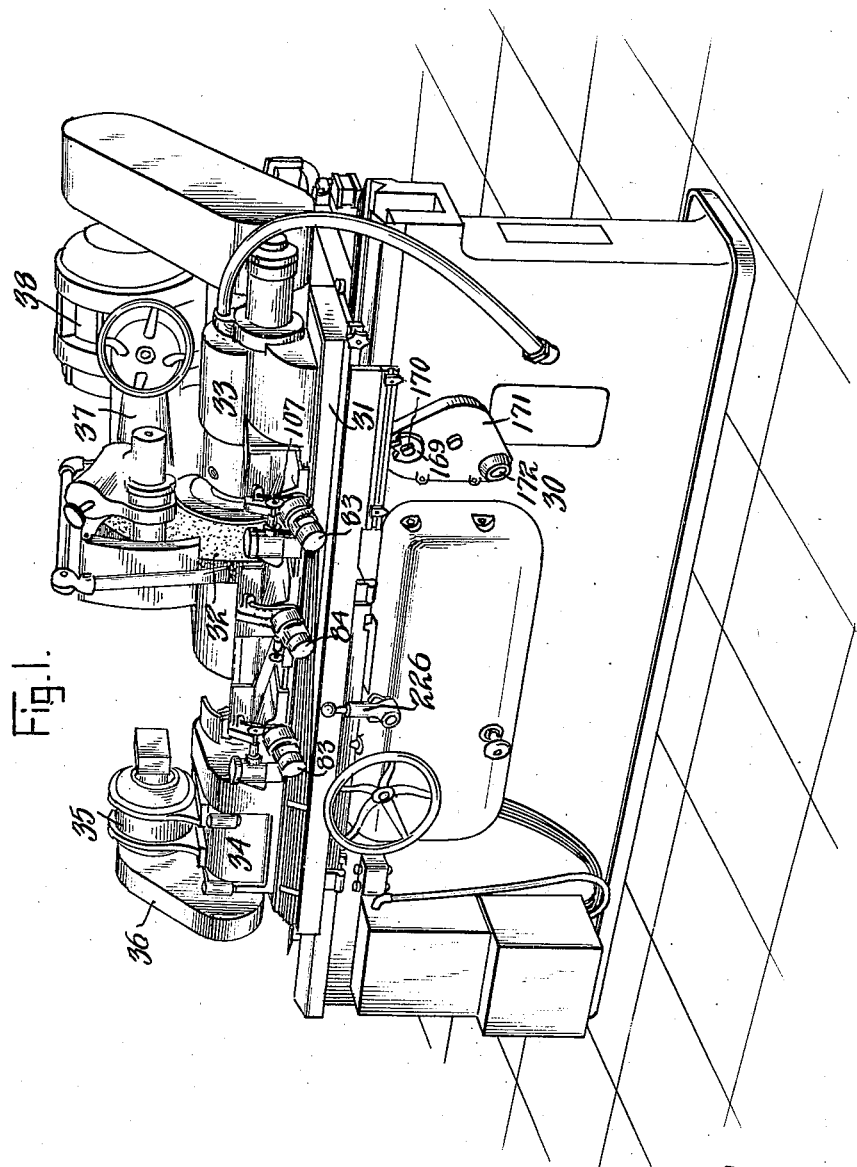
Inventors
Conrad L. Ott
Harold E. Balsiger
By
Attorney

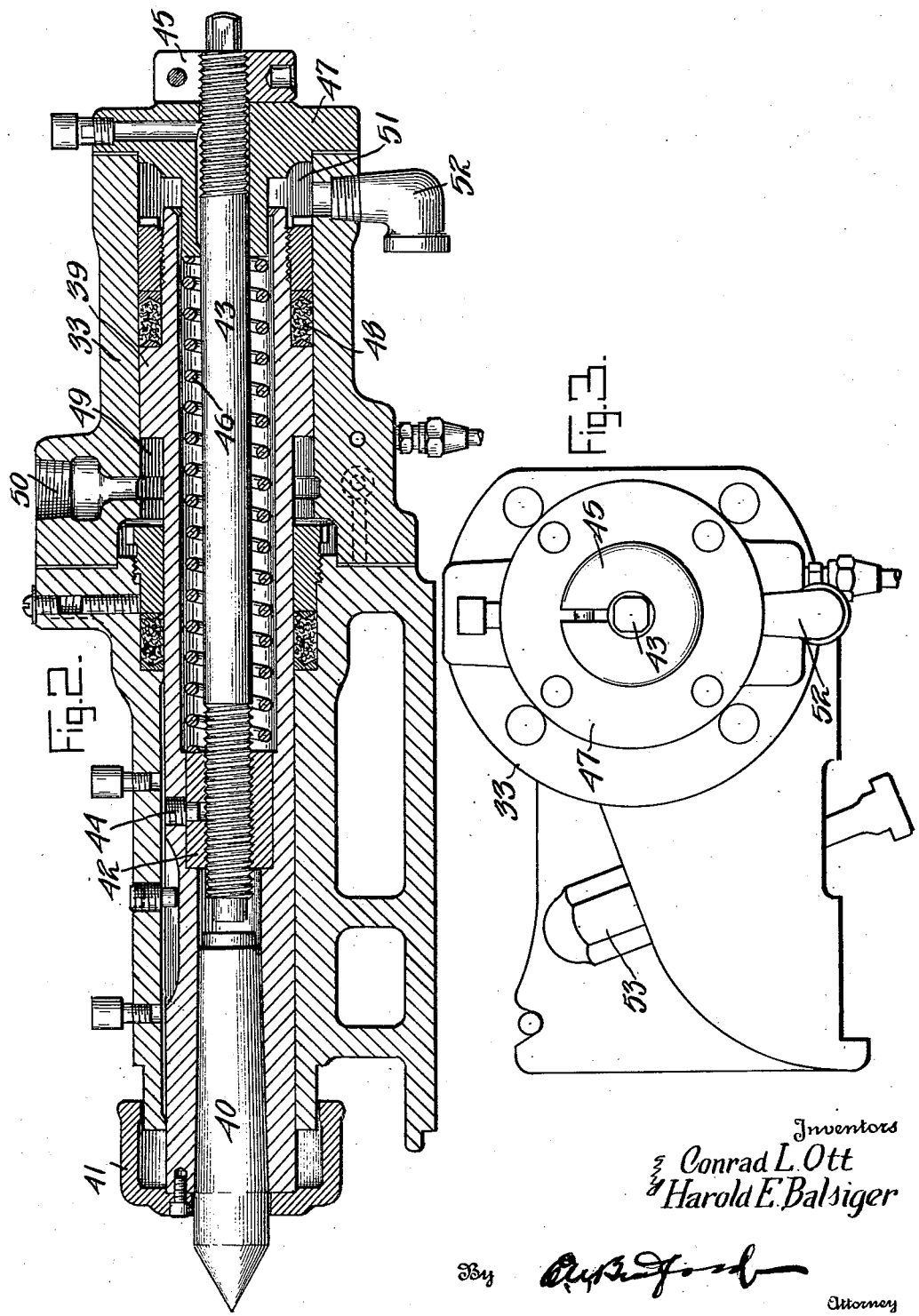

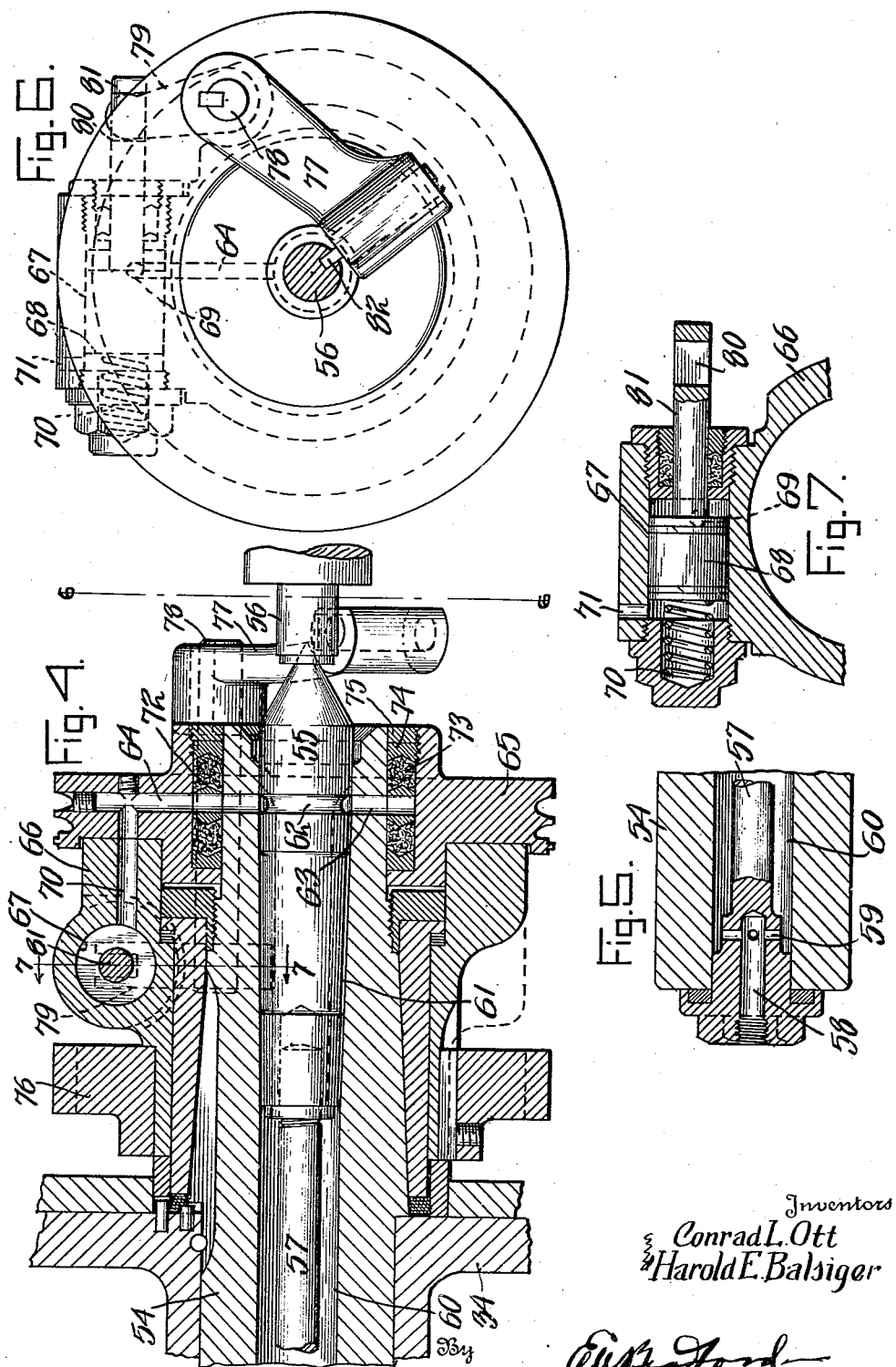

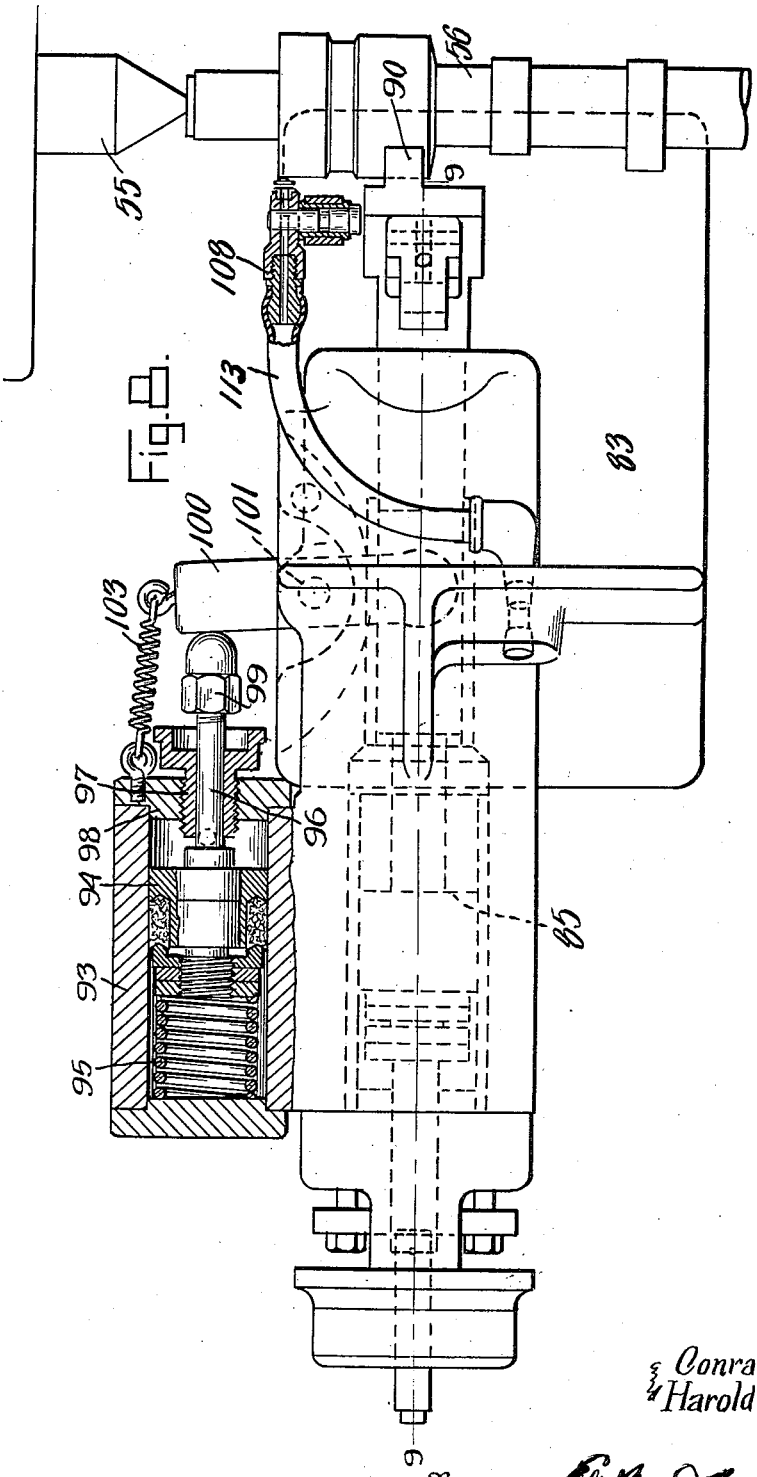

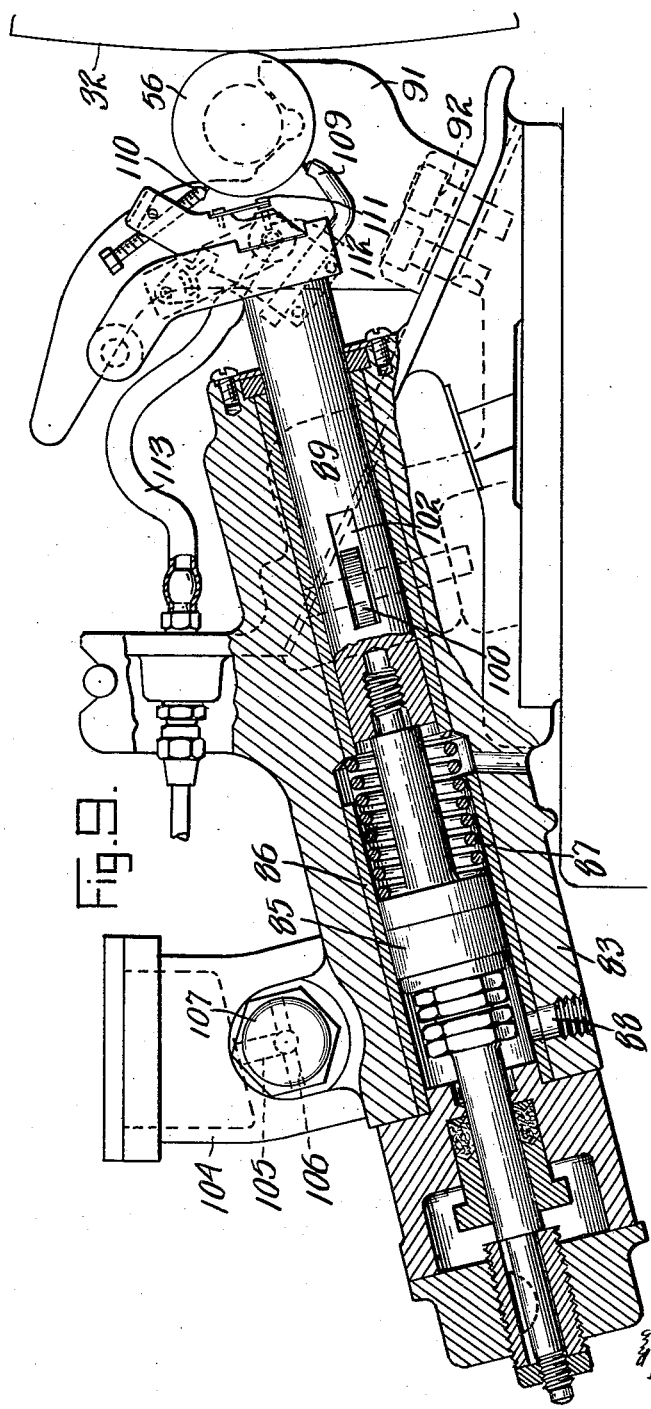

Jan. 18, 1938.  C. L. OTT ET AL  2,105,841
AUTOMATIC LINE BEARING GRINDER
Filed July 28, 1932  18 Sheets-Sheet 6
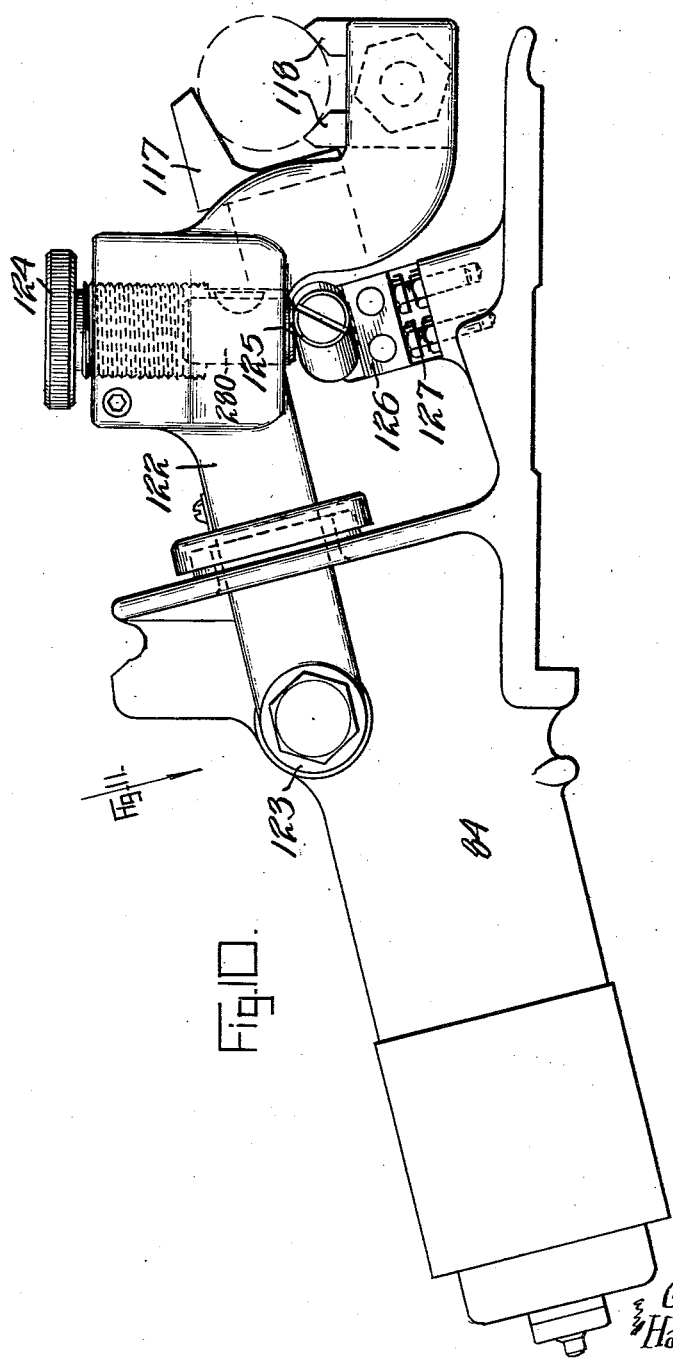
Inventors
Conrad L. Ott
Harold E. Balsiger
By
Attorney

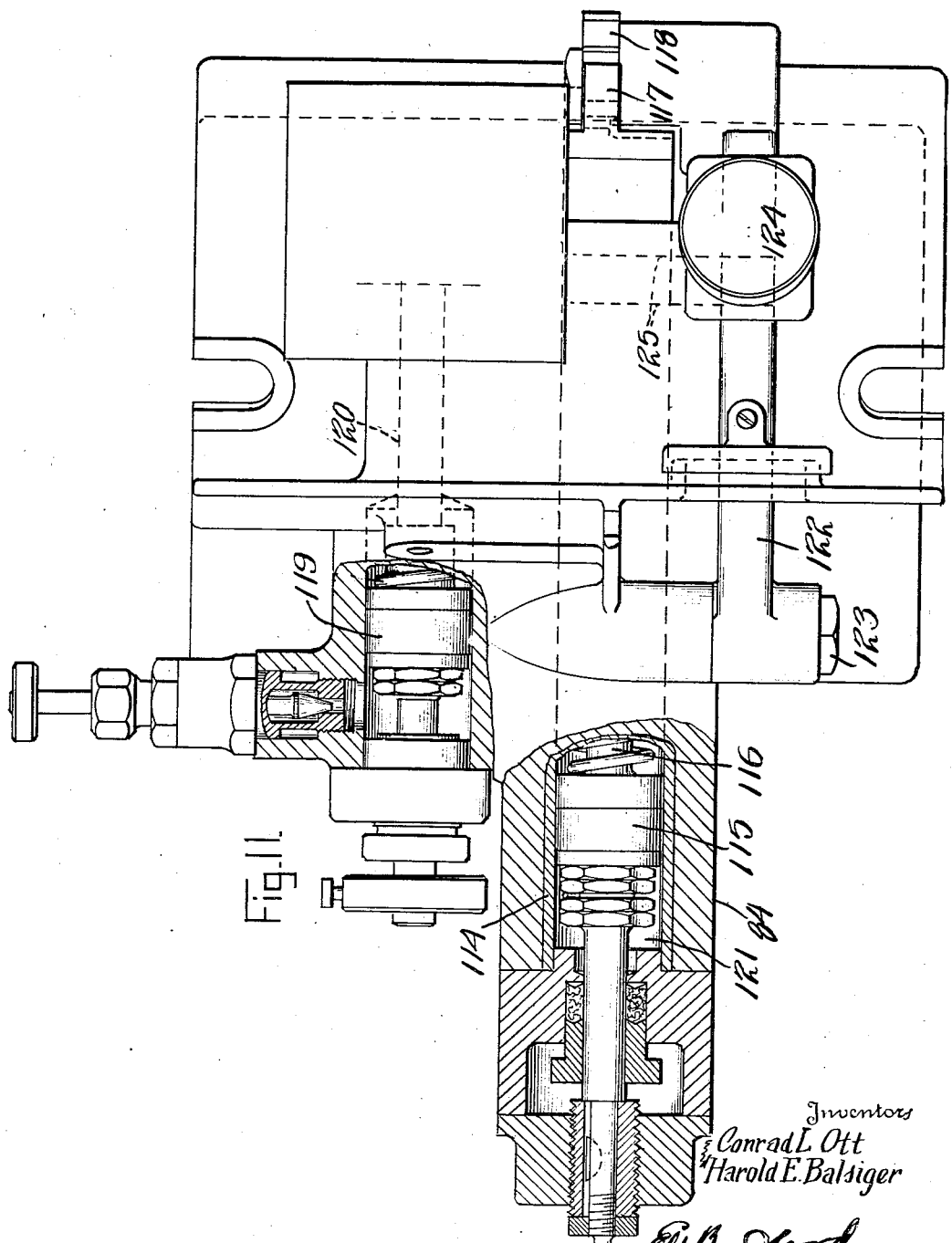

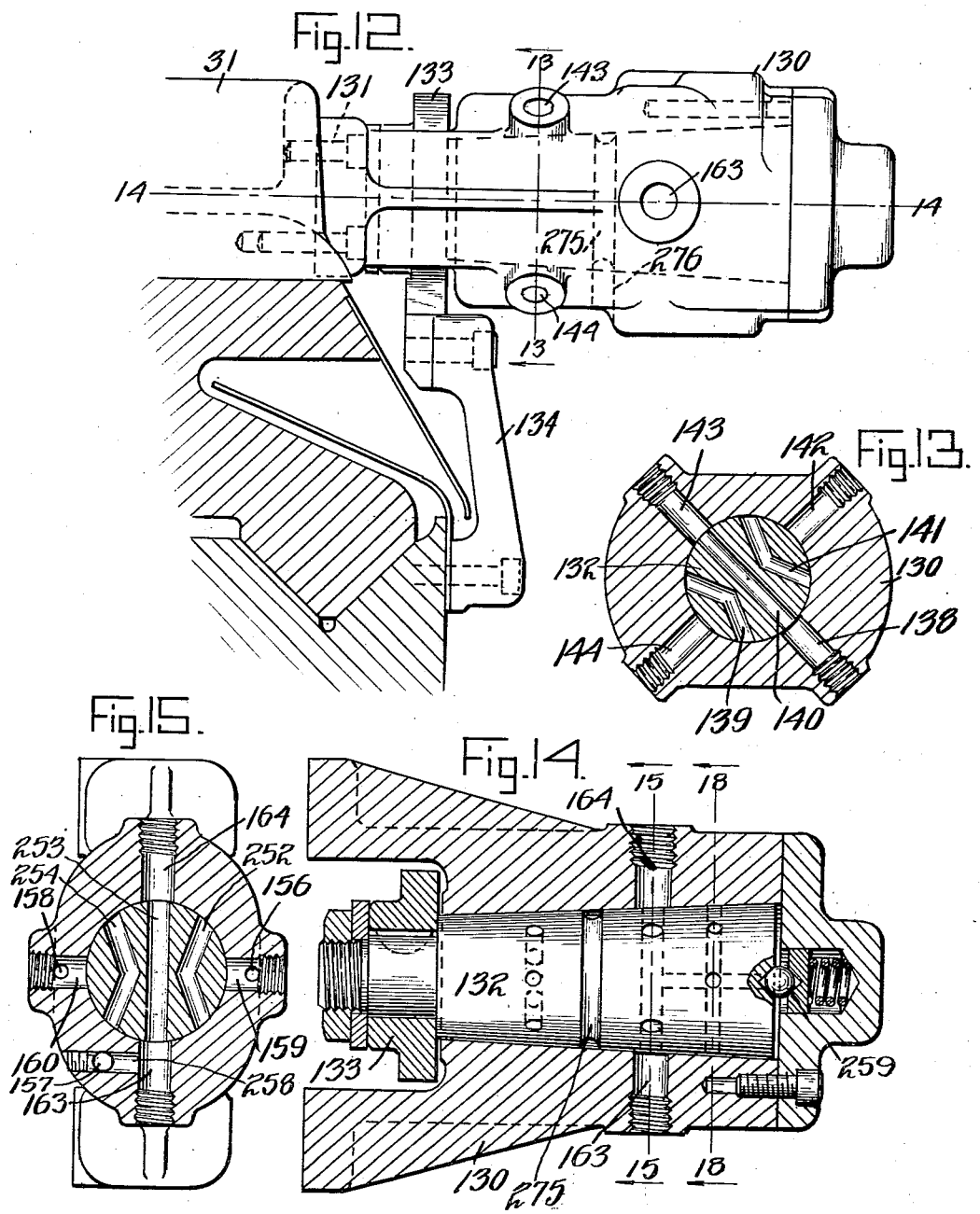

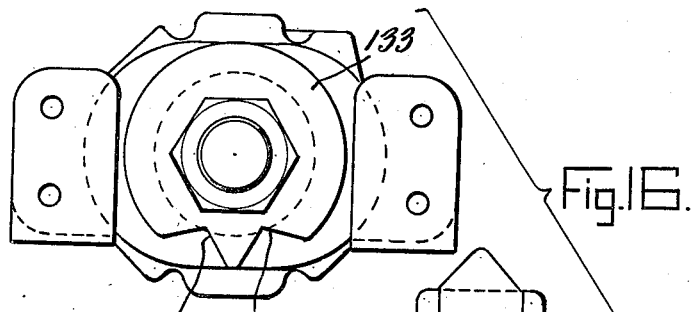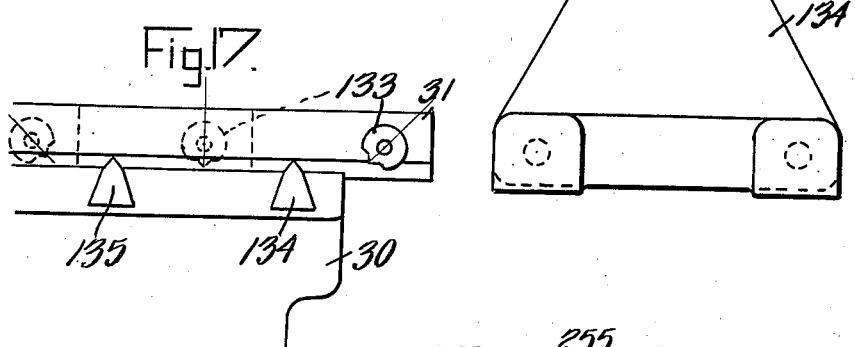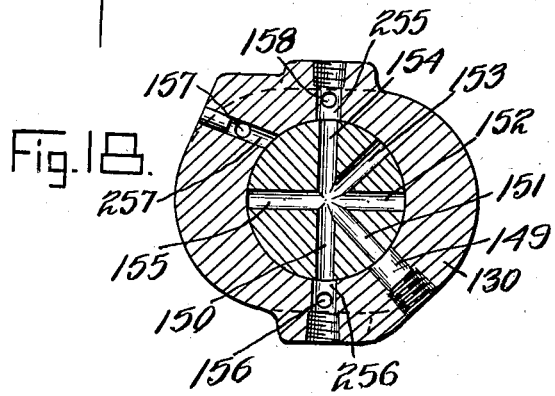

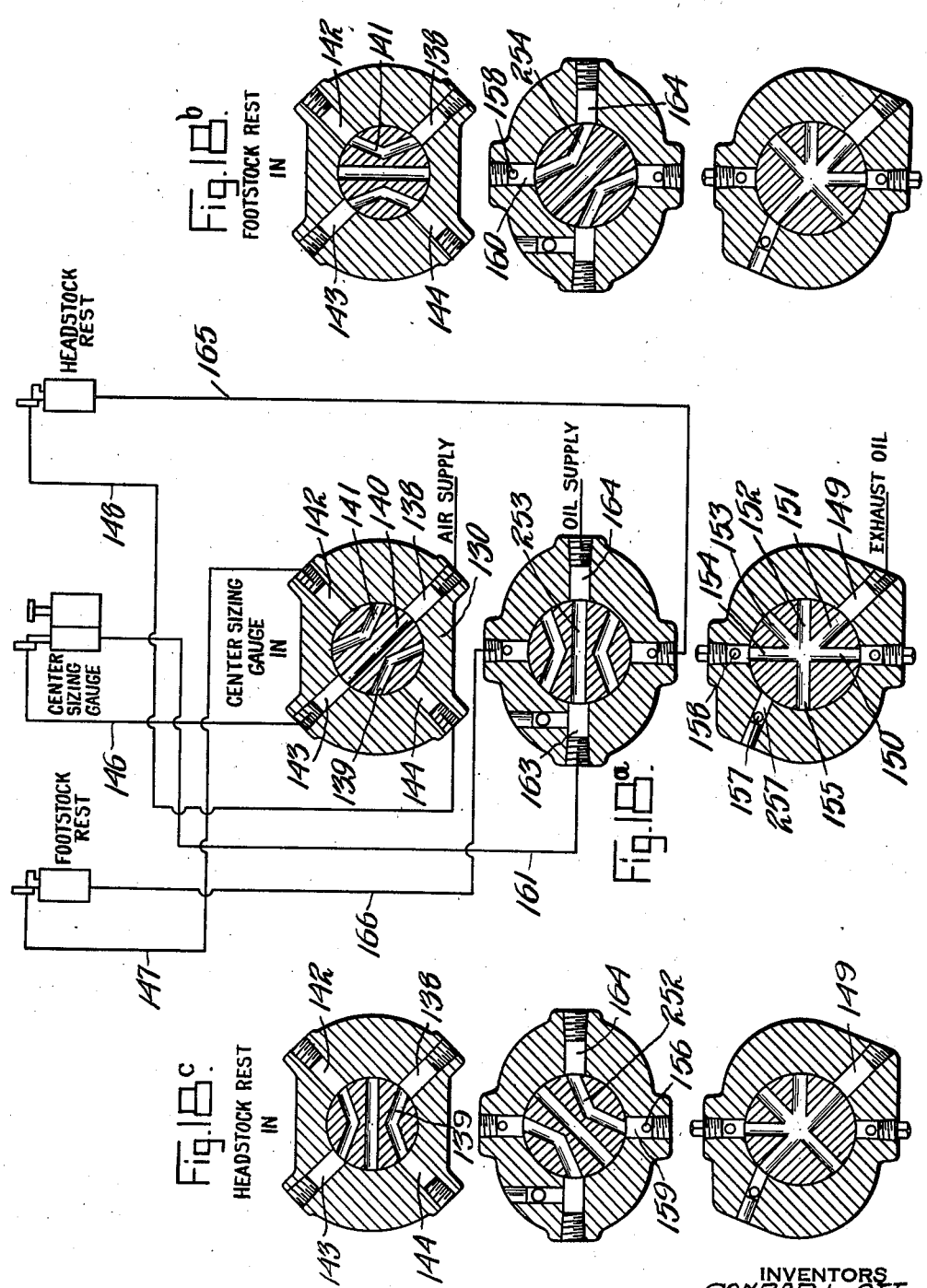

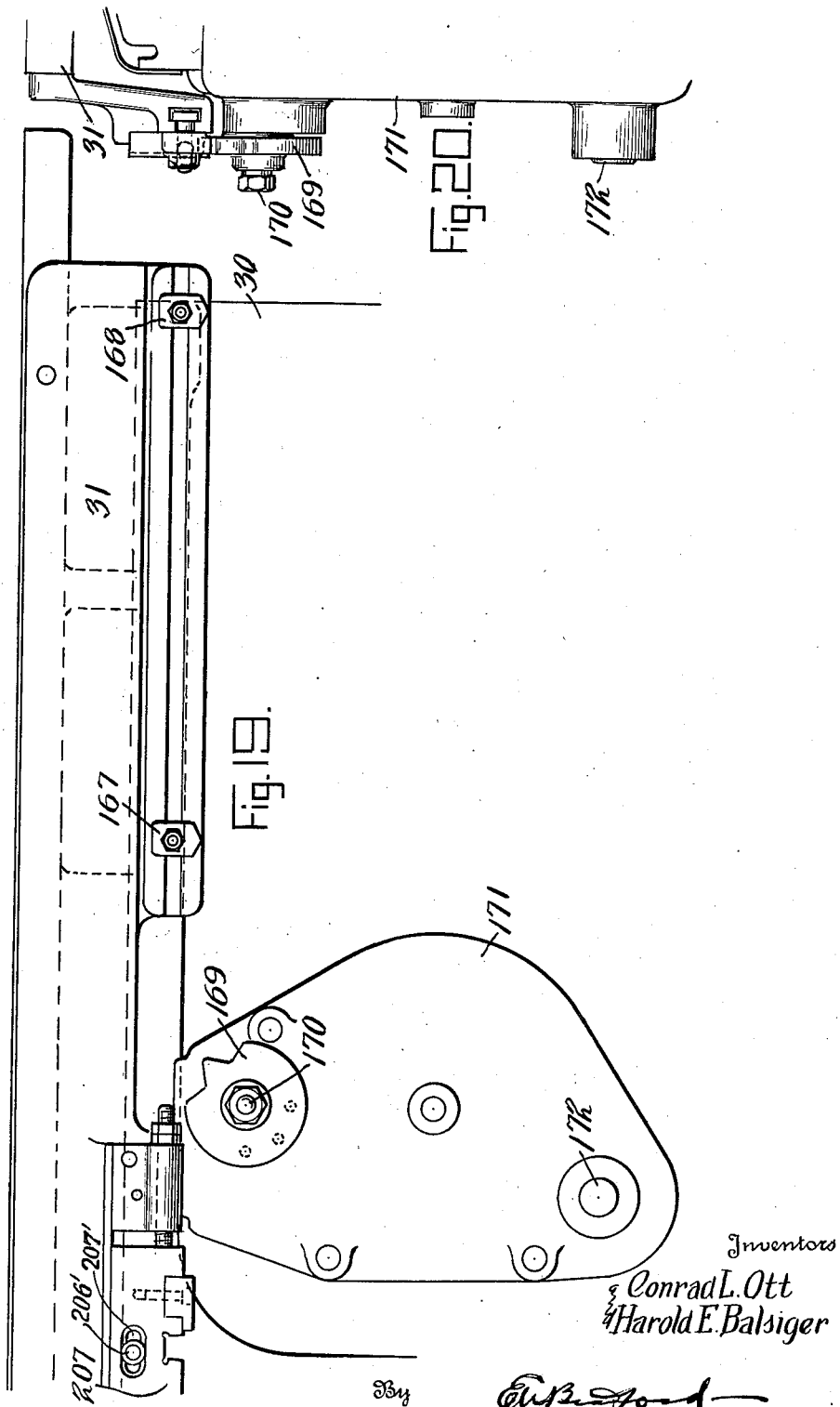

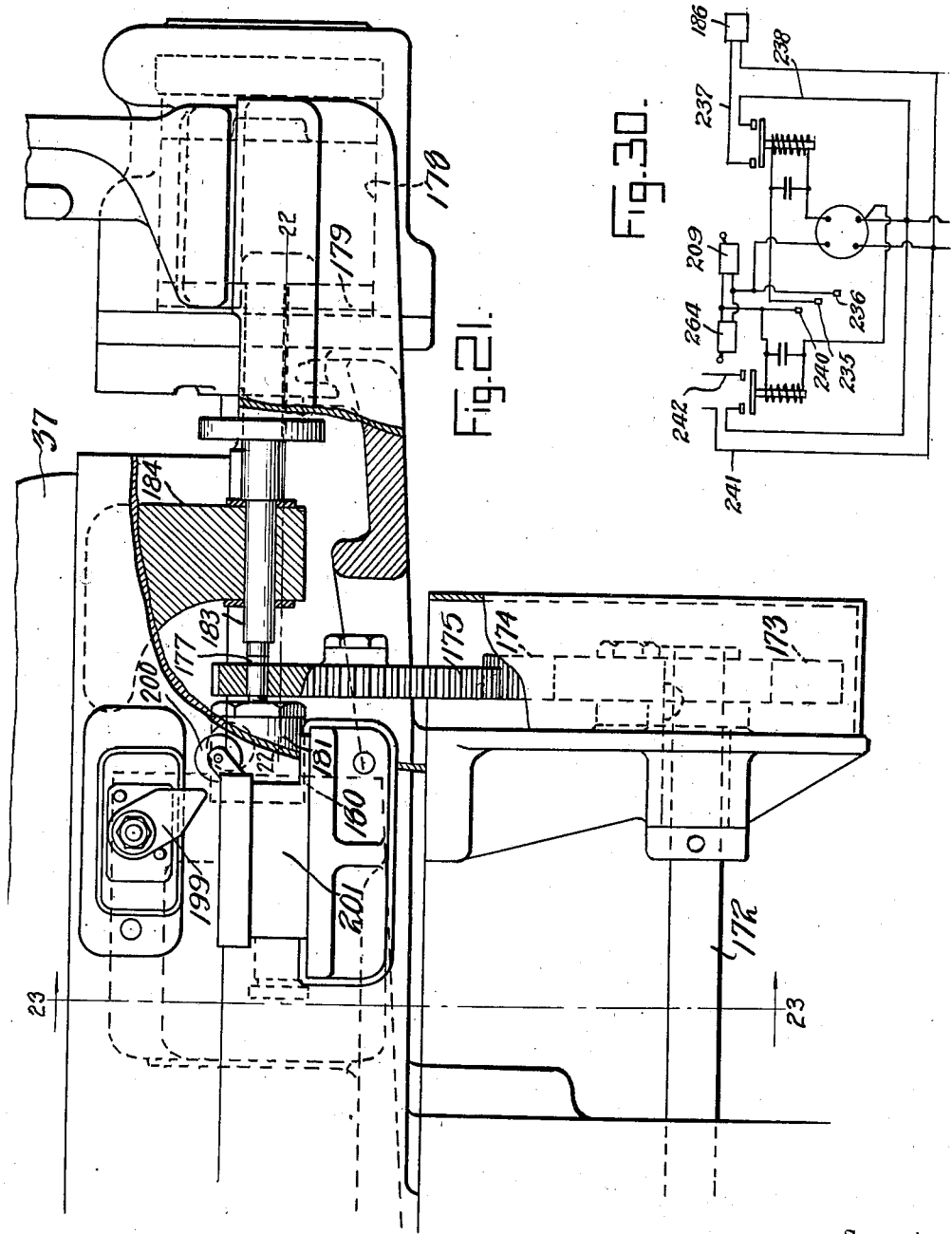

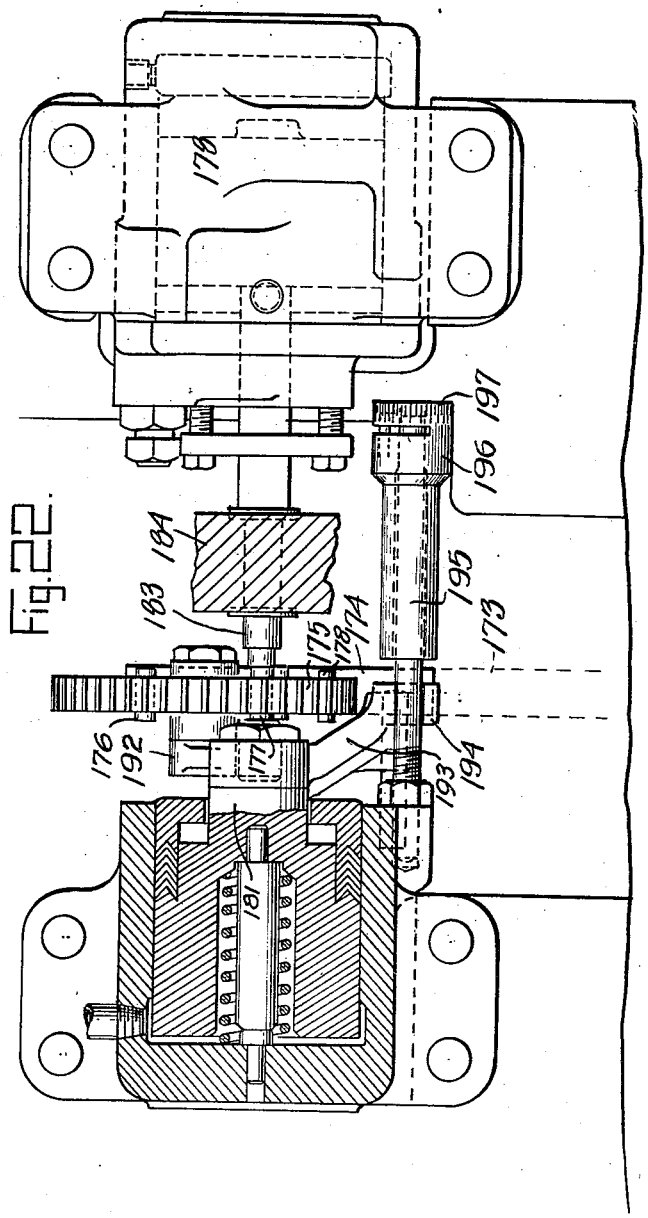

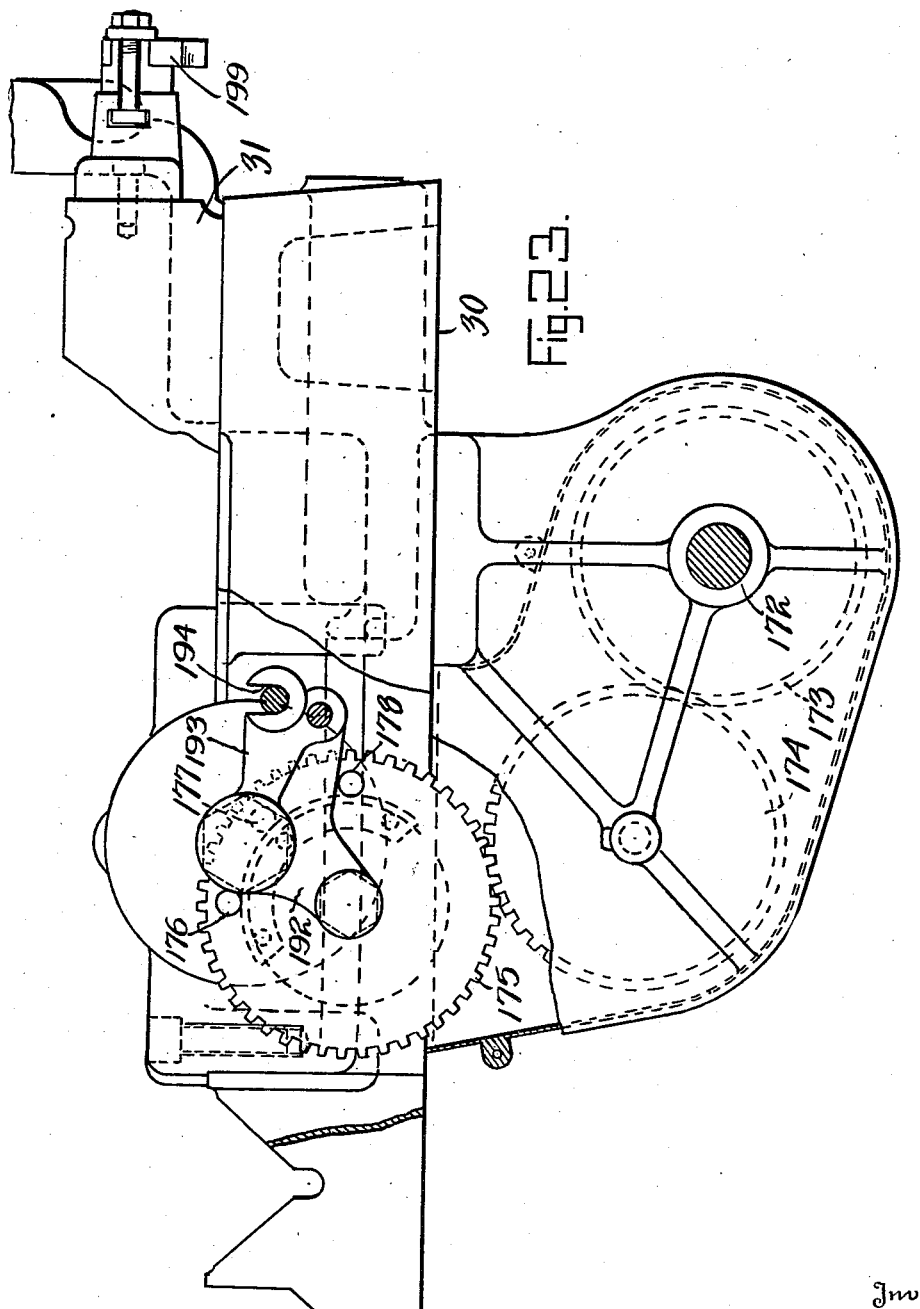

Jan. 18, 1938.   C. L. OTT ET AL   2,105,841
AUTOMATIC LINE BEARING GRINDER
Filed July 28, 1932   18 Sheets-Sheet 15
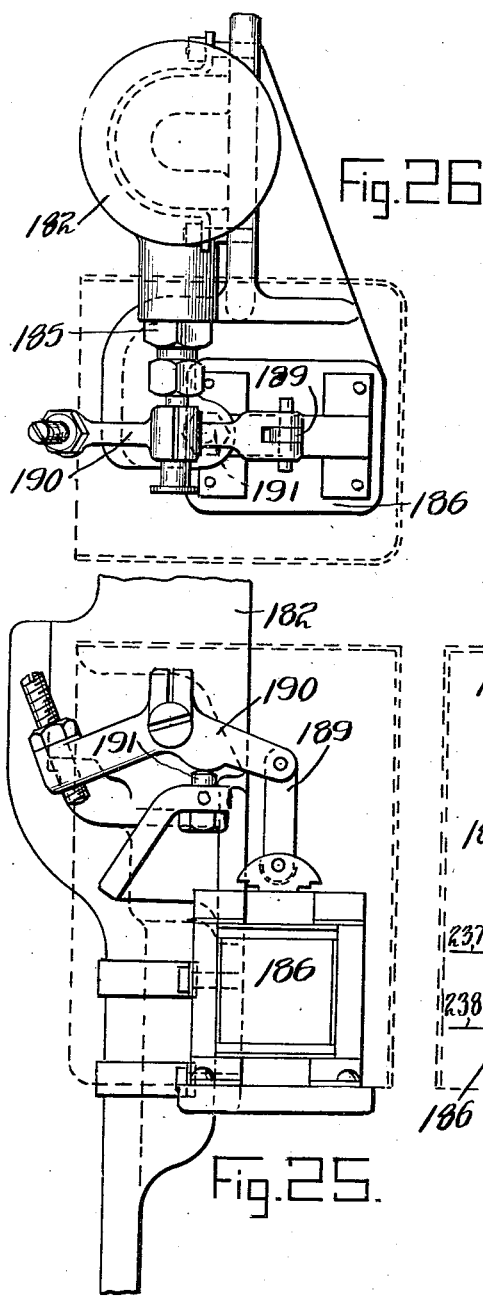
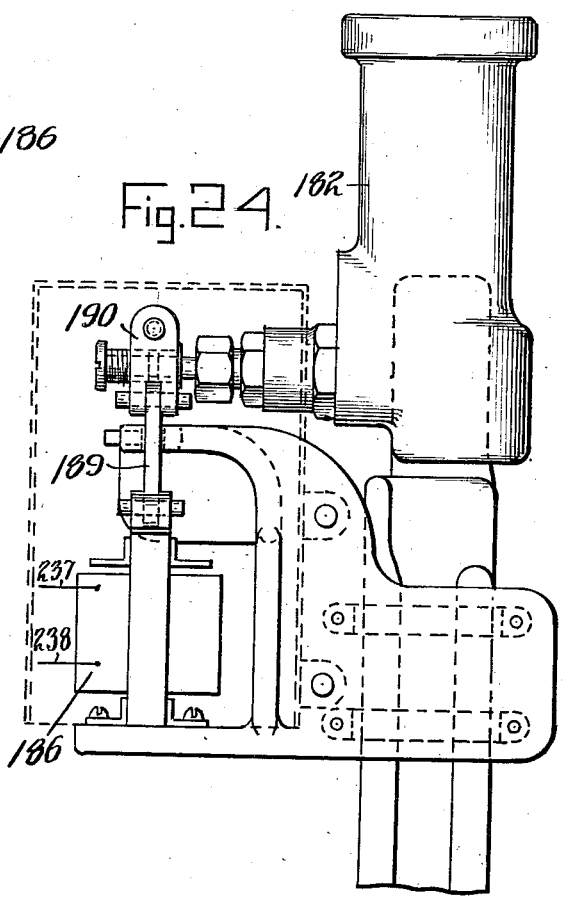
Inventors
Conrad L. Ott
Harold E. Balsiger
Attorney

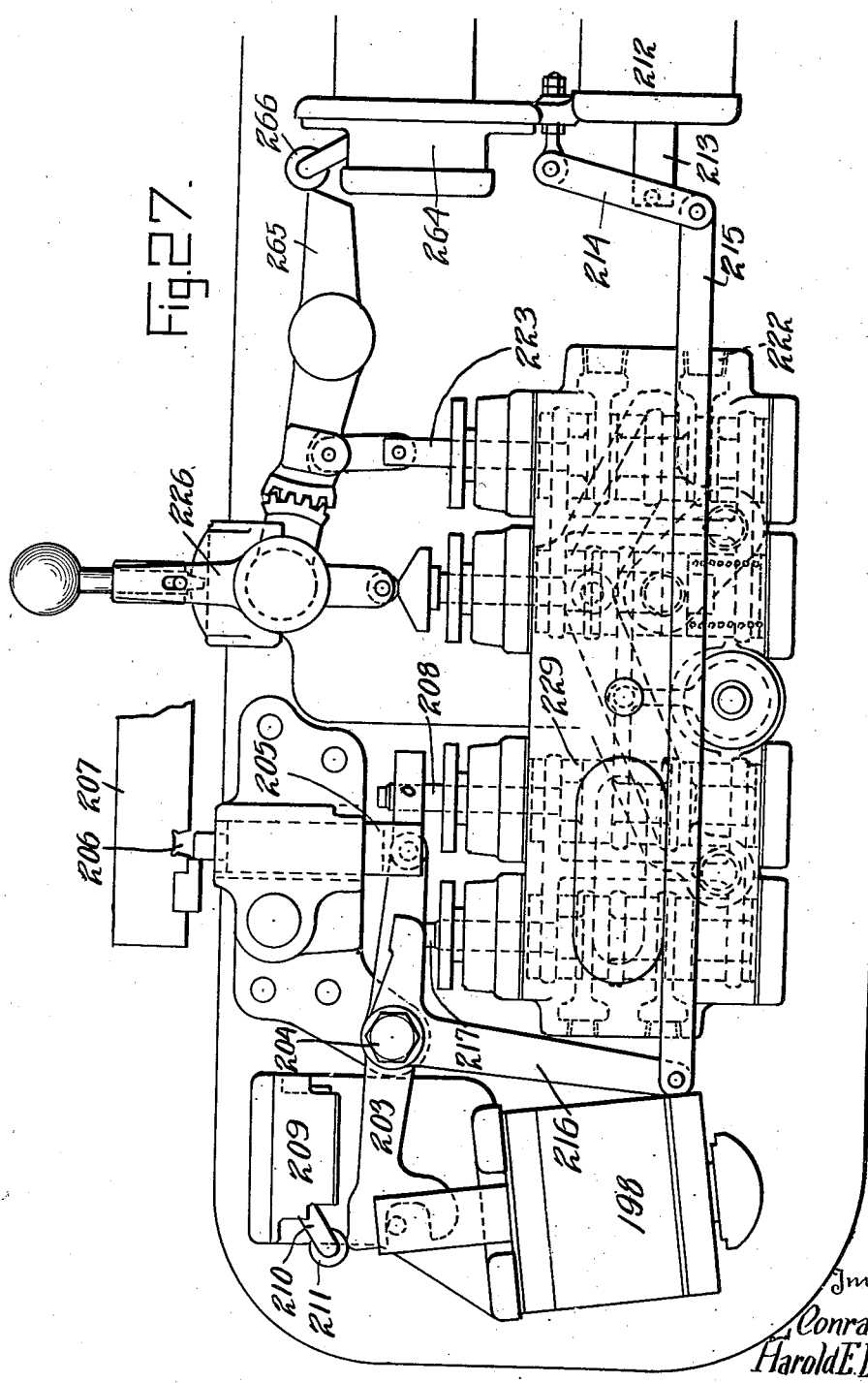

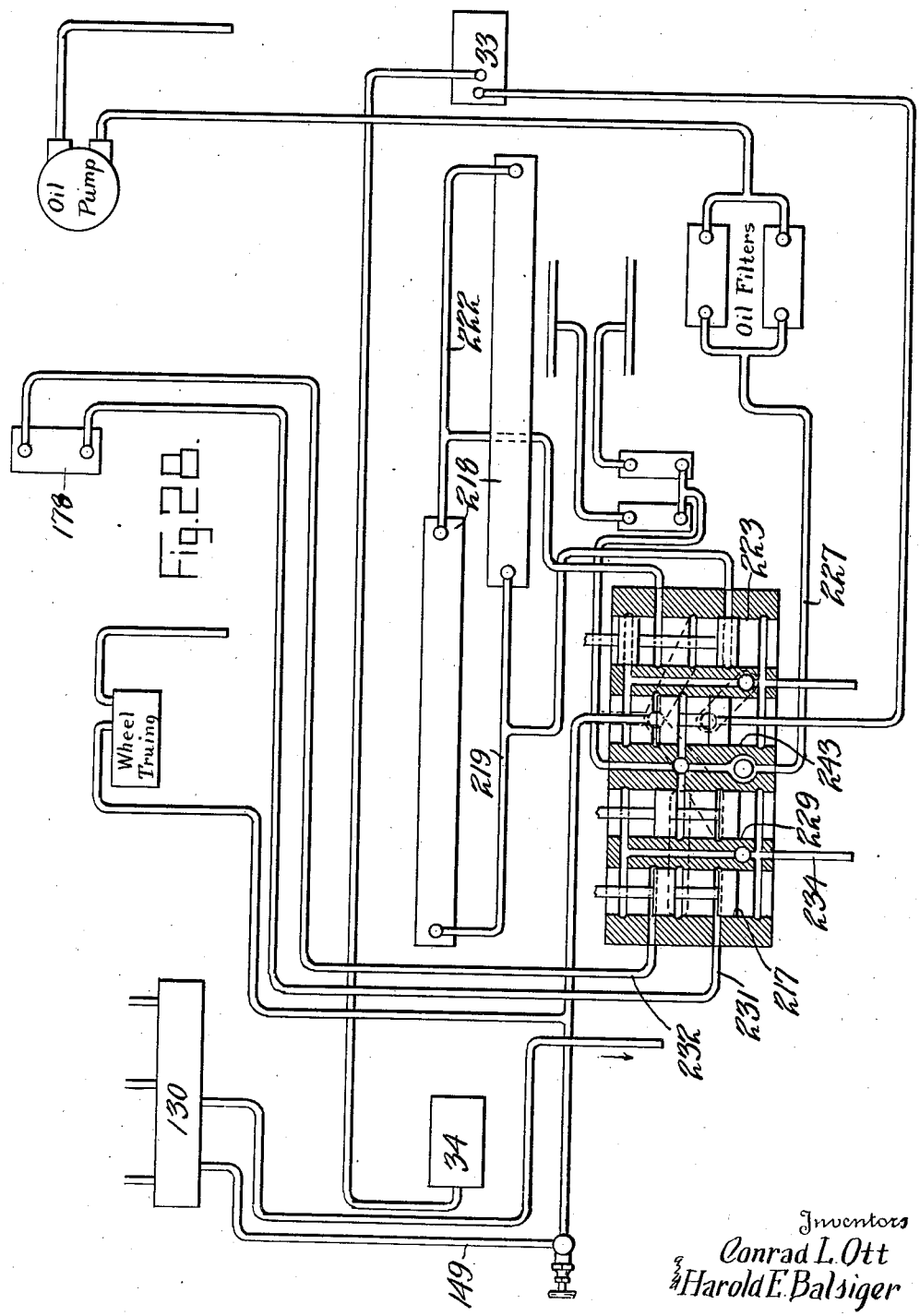

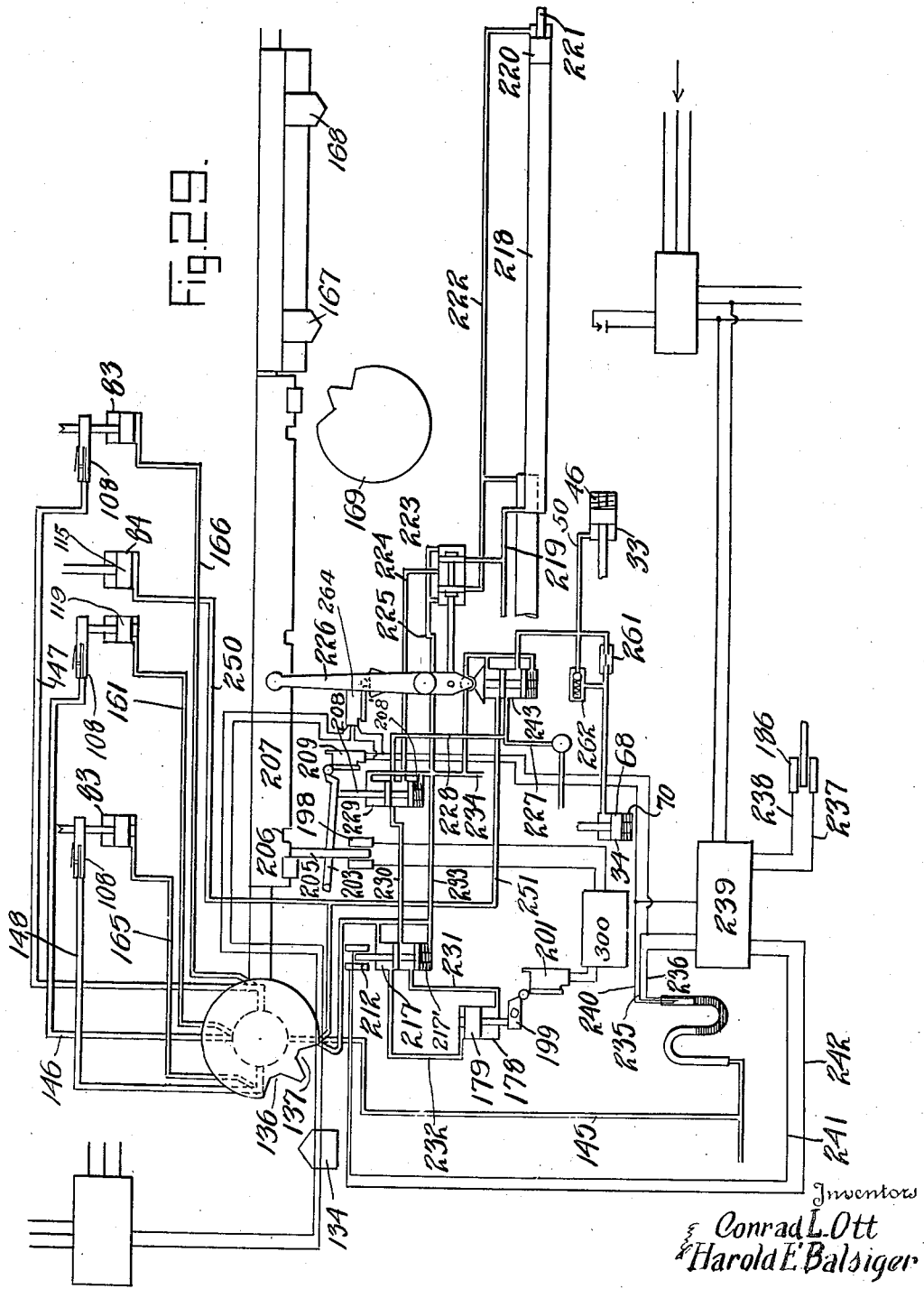

Patented Jan. 18, 1938

2,105,841

UNITED STATES PATENT OFFICE 2,105,841

AUTOMATIC LINE BEARING GRINDER

Conrad L. Ott and Harold E. Balsiger, Waynesboro, Pa., assignors to Landis Tool Company, Waynesboro, Pa., a corporation of Pennsylvania Application July 28, 1932, Serial No. 625,386

57 Claims. (Cl. 51—72)

This invention relates to grinding machines and is designed particularly with a view to its use in grinding successively each of several bearings on a cam shaft, and one of the principal objects is to provide a grinding machine having means for effecting a cycle of operations each of which operations is controlled by a sizing device.

A general object of the machine is to provide a grinding machine in which the bearings on the shaft may be ground and sized and the work carriage moved past the grinding wheel to position new bearings before the wheel and to move the wheel to grinding position and in which all of the several movements of the machine are automatically controlled.

A still further object is to provide wheel feed means in which the slow feed of the wheel base toward the work may be regulated in accordance with the amount of stock to be removed from the respective bearing.

A still further object is to provide a hydraulic control system for operating the several devices on the machine and which is itself controlled by a sizing device in response to reduction in the size of the work.

Further objects are to provide new and improved head and tail stocks, new and improved wheel feed mechanism, new and improved back rests and work supports, and new and improved work sizing devices.

Further general objects and advantages will become apparent from the description which follows.

Referring to the accompanying drawings, which are made a part hereof and on which similar reference characters indicate similar parts, Figure 1 is a front elevation of a grinding machine constructed according to my invention, Figure 2, a longitudinal section of a tail stock for supporting one end of the work, Figure 3, an end elevation of the tail stock looking from the right in Figure 2, Figure 4, a longitudinal section of a portion of the inner end of the head-stock, Figure 5, a longitudinal section of a portion of the outer end of the head-stock, Figure 6, a face view of the head-stock looking from the right along line 6—6 of Figure 4, Figure 7, a section on line 7—7 of Figure 4, Figure 8, a plan view of one of the end backrests showing a part of a sizing device in section and a part of a cushioning device for the backrest in longitudinal section, Figure 9, a longitudinal section on line 9—9 of Figure 8, Figure 10, a side elevation of the center backrest, Figure 11, a plan view of the center backrest with parts shown in section, Figure 12, a side elevation of a control valve for operating the back rests and the sizing devices, Figure 13, a section on line 13—13 of Figure 12, Figure 14, a longitudinal section of the control valve taken on line 14—14 of Figure 12, Figure 15, a section on line 15—15 of Figure 14, Figure 16, an end view of the control valve showing dogs for operating the star wheel on the valve.

Figure 17 is a view in elevation showing the operating dogs on the bed of the machine and their relation to star wheel operating devices for the valve which controls the back-rest and the sizing devices, Figure 18, a section on line 18—18 of Figure 14, Figures 18a, 18b and 18c are diagrammatic views looking from the rear of the machine and showing the positions of the control valve when grinding the center bearing and the right and left bearings respectively.

Figure 19 is a front elevation of means for changing from high speed to feeding-in speed of the grinding in accordance with the size of the bearing being ground, Figure 20, a right end view on Figure 19, Figure 21, a side elevation of a portion of the gear connection for operating means for changing from fast to slow feeding-in of the wheel base, Figure 22, a horizontal section on line 22—22 of Figure 21, Figure 23, a vertical section on line 23—23 of Figure 21, with the feed motor removed so as to show in full lines the gear carrying the control pins Figure 24, a side elevation of a portion of the wheel feed device, Figure 25, a front elevation as seen from the left in Figure 24, Figure 26, a plan view of Figure 25, Figure 27, a front elevation of the main control valve assembly, Figure 28, a diagrammatic view of the hydraulic control fluid lines, and Figure 29, a diagrammatic view of the oil circuits and the control line, Figure 30 is a diagrammatically enlarged view of the contacts and some of the electric circuits.

In the drawings numeral 30 indicates the bed of a grinding machine having a work carriage 31 mounted thereon for reciprocation transversely of a grinding wheel 32 mounted on a wheel base 37. The work carriage has mounted thereon a tail-stock 33 and a head-stock 34. The head-stock is driven by means of an electric motor 35 through suitable driving means enclosed in a housing 36. The driving connection may be and preferably is a belt or chain. The grinding wheel is mounted on a wheel base 37 and is moved toward and from the work by members which will be later described. The grinding wheel is driven by means of an electric motor 38 mounted on the wheel base 37.

Head and tail-stocks

The tail-stock 33 comprises a cylindrical housing having a piston 39 operable therein. The inner end of the piston 39 is chambered to receive a tapered work engaging center 40. A cup 41 is secured to the end of the piston 39 and engages over the cylindrical end of the tail stock to prevent dirt or other injurious substances from entering into the cylinder in which the piston operates. The piston 39 is provided with a screw threaded plug 42 into which the threaded end of a shaft 43 engages, the plug 42 being secured in the piston by means of a screw 44. The outer end of the shaft 43 is screw threaded to receive a nut 45 for locking the shaft 43 in position. The purpose of the shaft is to eject the work center 40. A compression spring 46 surrounds the shaft 43 and engages the plug 42 at one end and engages the inner end of a cover plate or plug 47 at its other end, the spring tending to urge the piston 39 carrying the centering pin 40 toward the work. Packing glands 48 are provided about the piston 39 to prevent leakage of fluid from a chamber 49. A pressure fluid line 50 is connected to the chamber 49 for supplying fluid under pressure for withdrawing the tail-stock out of engagement with the work. A chamber 51 at the right of the piston 39 is provided with a drain connection 52 for conducting any fluid which may leak past the piston back to a suitable reservoir in the bed of the machine. The tail-stock assembly is secured upon the work carriage by means of a bolt the head of which is at 53. In operation the work center 40 remains stationary, the work being rotated relative to the pin.

The head-stock 34 comprises a stationary element 54 which is chambered to receive centering pin 55 having a pointed end engaging the depression in the end of the work 56. A shaft 57 has a screw threaded end engaging in the inner end of the work center 55. The outer end of the shaft 57 has an axial bore 58 terminating in radial bores 59 which communicate with a chamber 60 surrounding the shaft 57. The bore 58 is connected to a pressure fluid line which supplies fluid for operating work driving mechanism later to be described.

The work centering pin 55 is provided with longitudinal grooves 61 which terminate in an annular groove 62. The annular groove communicates with a plurality of radial passages 63 which passages in turn communicate with passage 64 in a head portion 65. The head portion 65 is secured in any suitable way to a housing 66 in which is provided a cylinder 67 in which cylinder operates a piston 68. The cylinder 67 is provided with a port 69 through which pressure fluid is admitted from the passage 64 to the chamber at the front of the piston 68. A compression spring 70 is positioned against the inner end of the piston 68 and operates against the pressure fluid applied through the port 69. Any leakage of pressure fluid past the piston 68 may escape through a port 71 which is drilled through the housing or cylinder 67. A packing ring 72 is provided for expanding packing elements 73. A gland 74 is urged inwardly to compress the packing by means of a ring 75 which is screw threaded within the bore in the head element 65. The head element 65 and the housing 66 with their associated and connected parts are mounted on the stationary element 54 and are rotated by means of a sprocket wheel 76. A work driving arm 77 is mounted on a shaft 78 which is carried in the element 65. An arm 79 is secured to the inner end of the shaft 78 and this arm engages in a notch or slot 80 in the outer end of the piston rod 81 which is attached to the piston 68. The arm 77 has a dog 82 which engages the key slot or notch in the end of the work-piece 56. For the present purposes of description the work-piece may be regarded as a cam shaft, the bearings of which are to be ground. The work engaging arm 77 is moved to work engaging position by means of the spring 70 and is moved from work engaging position by pressure fluid applied through the ports 64, 70 and 69.

Back-rests and work supports

In grinding the bearings on a cam shaft it is necessary to support the shaft opposite the grinding wheel at all times and it is advisable also to have the shaft supported intermediate its ends at all times. In order to do this we have provided back-rests 83 which support the end bearings and a slightly different form of back-rest 84 for supporting the shaft intermediate its ends. Both of the end back-rests are alike. It is necessary therefore to describe only one. This back-rest consists of a body portion in which is a cylinder, in which operates a piston 85. It may be advisable to provide a lining 86 in the cylinder in which the piston 85 operates. The piston 85 is urged toward the work by fluid under pressure supplied through pipe connection to port 88. The piston is retracted by a spring 87.

The forward end of the piston rod 89 carries work engaging shoes 90 which engage the work and support it opposite the thrust of the grinding wheel. The work is supported in two or more saddles 91 which are secured upon the work rest by means of bolts 92. Movement of the back-rest member toward the work is cushioned and controlled by hydraulic means which consist of a cylinder 93 having a piston 94 operable therein. A spring 95 is seated between the end of the piston and the inner end of the cylinder 93. A plunger 96 is slidable through a plug 97 which is screw-threaded into the head 98 of the cylinder. The outer end of the plunger 96 carries an adjustable nut 99 which engages the outer end of a lever 100 which lever is pivoted at 101 to the backrest casing. The inner end of the lever 100 extends into a slot 102 in the piston rod 89. A spring 103 attached to the end of the lever 100 at one end and attached in the cover 98 at its other end tends to rock the lever 100 in a counterclockwise direction to hold it against the end of the plunger 96. A fluid reservoir 104 is mounted on the back rest casing and communicates through ports 105 and 106 with the chamber at the rear of the piston 94. The ports are provided with suitable check valves not shown and restricted passages controlled by needle valves 107 to permit fluid to flow freely from the reservoir into the chamber at the rear of piston 94 but to restrict the flow of fluid out of the chamber at the rear of piston 94. The piston 94 and associated elements therefore condition and check movement of the back-rest toward the work. As a matter of fact by means of the needle valve 107 flow of fluid from the chamber at the rear of piston 94 will be controlled so as to permit the back-rest to be moved toward the work exactly at the speed with which the stock is removed from the work by the grinding wheel. By reason of this construction the back-rest will engage the work with a constant pressure as the work is reduced in diameter.

A pressure fluid gaging device 108 is mounted upon the forward end of the plunger of back-rest 83. Fluid under pressure is supplied to the gaging device through line 148. The gaging device is that shown in the patent granted Harold E. Balsiger, May 14, 1935, No. 2,001,447, and further description thereof is not thought necessary. While the particular gaging device described in said application is admirably adapted for use with this machine we are not limited in the use of any particular kind of automatic sizing or gaging device. As will be apparent from the description which follows any gaging device might be put in control of electrically operable and hydraulically controlled mechanism to control operation of the machine. It will be sufficient to state that when the work has been reduced to the desired size work engaging elements 109 and 110 will move in towards the work and permit work contacting element 111 to move closer to fluid nozzle 112. When element 111 has come sufficiently close to nozzle 112 flow of fluid from pressure line 113 will be restricted so that pressure will build up in this line and this built up pressure will be controlled to set in operation controlling mechanism on the machine for withdrawing the back-rest and the gaging device, for withdrawing the grinding wheel from grinding position and for indexing the cam shaft to present another bearing before the face of the grinding wheel.

The application of the gaging device to the present machine will become apparent from the description and the diagrammatic showing in Figure 29.

The back-rest and work gaging device just described are positioned at each end of the work carriage and support the ends of the cam shaft only. A center back rest is shown in Figures 10 and 11. This back rest consists of a body portion which forms the cylinder 114 having a piston 115 mounted therein. The piston has attached a piston rod 116 on the forward end of which are mounted work engaging jaws 117 and 118. An auxiliary cylinder carries a piston 119 having a piston rod 120 on the forward end of which is a sizing device similar to that just described on the end back-rests. The sizing devices on the end back-rests move in with the back-rests on which they are mounted. The center back-rest, as will be seen is at all times in its forward position. The sizing device is in engagement with the work only during the grinding of the bearing. It is necessary therefore to provide for operating the center sizing device independently of operation of the back rest. Pressure fluid is applied to the piston 115 at the rear in chamber 121 to move the back-rest toward work engaging position. The forward end of the back rest plunger carries a jaw 117. The jaw 118 is mounted on a bracket 122 which is pivoted at 123 to the back-rest casing or casting 84. Bracket 122 carries a screw 124, the lower end of which bears on a plunger 280 which is set at an angle and is in engagement with a pin 125 slidably supported on a bracket 126 which bracket is adjustable by means of screws 127. From the construction shown it will be apparent that as the back-rest plunger, which carries pin 125, moves forward the pin 125 acting against the end of plunger 280 will swing the bracket 122 to move jaws 118 tightly against the work.

In normal grinding operations the center back-rest 84 just described will be in forward or work engaging position at all times for it is advisable to support work at the center as well as at the end upon which the grinding wheel is at work. While the center back-rest member must always be in engagement with the work, the sizing device carried by the center back-rest member will be moved in only when the grinding wheel is grinding the center bearing. As described above pressure fluid operating means therefore are provided for moving the sizing device toward the work independently of the movement of the back rest toward the work.

*Sizing devices and control valve for back-rests*

In Figures 12 to 18 inclusive are shown means for operating the end back rests and for operating the center sizing device and also for controlling admission of air to the nozzles of each of the sizing devices. As will be apparent, only one of the sizing devices will be in operation at a time. It is advisable therefore to cut off the supply of air under pressure to the sizing devices which are not operated. The valve shown in Figures 12 to 18 inclusive provides means for controlling pressure fluid to the several devices mentioned.

The valve consists of a casing 130 which is secured to the work carriage 31 adjacent one end and as shown is secured at the rear of the work carriage by means of bolts 131. This casing contains a rotary valve 132 which is operated by means of a star wheel 133 which is secured on an end of the valve which projects out of the casing. The valve moves with the work carriage and is operated by means of dogs 134 and 135 secured to the bed of the machine. The star wheel 133 is notched at 136 and 137 to provide engaging projections for each of the dogs so that the valve will be rotated to each of several positions as will later be more fully described.

The valve is drilled to provide ports through it as shown at 139, 140, and 141. The valve casing is also provided with a series of outlet ports 142, 143, and 144. Air from a suitable air supply under suitable pressure is delivered to the casing through the port 138. This supply line is shown diagrammatically at 145 in Figure 29. Port 143 is connected by means of pipe 146 with the sizing device on the center back-rest 84. Port 142 is connected by pipe 147 to the sizing device at the right hand end of the machine and port 144 is connected through pipe 148 with the sizing device at the left end of the machine. The terms right-hand end and left-hand end of the machine refer to the operator's right hand and left hand when standing in front of and facing the machine. When the valve is in the position shown in Figure 13 air is supplied through pipe 145 through ports 138, 140 to port 143 and thence to line 146 to the sizing device on the center back-rest. When in this position the wheel will be grinding the center bearing on the cam shaft. When the valve is rotated by movement of the work carriage to the left valve 132 will be rotated by dog 134 engaging star wheel 133, to bring port 141 to connect port 138 with port 142; air then will pass from the pressure line 145 through port 138 and port 141 in the valve and through port 142 into line 147 to the nozzles of the sizing device at the right end of the work carriage. When in this position the grinding wheel will be in engagement with the work to grind the bearing at the right-hand end of the camshaft. As the work carriage returns to central position again the dog 134 will rotate star wheel 133 to position the valve in the central position shown in Figure 13 at which time air will be supplied again to the center sizing device to size the center bearing.

It should be kept in mind that the machine operates to grind in both directions, i. e. when the work carriage has moved to the extreme right to finish grinding the left-hand bearing the cam shaft is removed and a new shaft positioned in the machine. The work carriage then moves to the left grinding each of the bearings in succession and when the work carriage has moved to the extreme left position the cam shaft is again removed and a new shaft to be ground is positioned in place. When this has been ground to size the work carriage will move to the right to position the bearing at the left end of the cam shaft in front of the grinding wheel. As the carriage moves to this position the dog 135 will rotate the star wheel 133 to bring port 139 into register with ports 138 and 144. Air from the pipe 145 will now be delivered through these ports to line 148 and to the sizing device on the left end of the work carriage to size the bearing which is being ground. It will be seen therefore that the valve is rotated to supply air to the sizing device which is opposite the grinding wheel and that it prevents escape of air since air is supplied only to the sizing device which is actually functioning during the grinding of its respective bearing.

The control valve 132 (Figures 12 to 18c inclusive) also operates the end rests. Fluid for operating the center back-rest is supplied through line 250 which is a branch from pipe 251 which latter pipe supplies fluid to a supply port 164 in the valve casing. As shown in Figure 18 the valve 132 is drilled to provide ports 150, 151, 152, 153, and 154 and 155. These are radial ports lying in the plane of line 18—18 of Figure 14. Other radial passages 252, 253, 254 are provided, these passages lying in the plane of line 15—15 of Figure 14. The casing of the valve is also provided with radial passages 159, 160, and 163. Longitudinal passages 156 and 158 connect radial bores 256 and 255 as shown in Fig. 18 with 159 and 160. The outer ends of the bores 255 and 256 are plugged. A radial passage 257 communicates with the interior of the valve and this passage is connected by a longitudinal bore 157 with a bore 258 which communicates with 163 to provide an exhaust from center rest gauge cylinder. A passage 149 is connected by means of a pipe 233 with the exhaust line 234. With the valve in the position shown in Figure 15 pressure fluid enters from the line 251 through the supply port 164 and passes through the bore 253 and out through the bore 163 into the pipe 161. This supplies pressure to the rear of piston 119 to move the center sizing device to work sizing position. The center back-rest is already in forward position since oil under pressure in line 250 is acting against piston 115. When the valve is in position shown in Figures 18 and 15 port 159 is in communication through port 156 with port 256 and through 150 and 151 fluid may exhaust to port 149. Port 159 is connected with the pipe 165 which operates the left back-rest. This back-rest therefore will be withdrawn. Port 160 is connected to the right back-rest through pipe 166. Fluid at the rear of the piston which operates this back-rest may exhaust through ports 158, 255, 154, and 151 to exhaust port 149. It will therefore be seen that with the valve in this position the center back-rest will be forward in work supporting position, and the center sizing device will also be in work engaging position, although operated independently of the center back-rest and with the two end back-rests with the two end sizing devices withdrawn from the work. Assume now that the work carriage is moved to the right until locking plunger 205 engages in notch 206 in the bar 207. Slots 207' permit the bar 207 to be adjusted longitudinally of the work carriage by bolts 206'. This will position the left bearing in the plane of the grinding wheel. As the carriage moves to this position the star wheel will be rotated in a clockwise direction as shown in Figure 29 to rotate valve 132 in a counterclockwise direction as shown in Figures 15 and 18, since these views are looking from the rear. As the valve is moved counterclockwise supply port 164 will be put in communication with port 159 the fluid passing through a port 252. Pressure will then pass through port 159 into pipe 165 to move the left back-rest to work engaging position, this back-rest of course carrying with it the sizing device which is mounted upon it. When the valve is moved to this position port 156 will be cut off so that fluid cannot exhaust to port 149. Pipe 166, however, will communicate through ports 160, 158, 255, 153, and 150 with exhaust port 149. Fluid therefore may exhaust from the rear of piston in the right back-rest so that this back-rest will be held in retracted position. The center back-rest which is always under pressure through line 250 will be maintained in its forward position. Fluid at the rear of the piston 119, however, may exhaust back through line 161, port 163, passage 258, 157, 257, 154, 150, to 149 and exhaust. (See Figures 13 to 18c inclusive.) The center sizing device therefore will be in its retracted position. An oil ring and oil drain are shown at 275 and 276, respectively.

*Wheel base drive*

In Figures 19 to 26 are shown means for changing from rapid to slow feed of grinding wheel base. Secured on the front of the work carriage are dogs 167 and 168 for operating a star wheel 169 which star wheel is secured on a shaft 170. Through any suitable gearing not shown and housed within a casing 171 shaft 172 is operated from shaft 170. Shaft 172 extends through the bed of the machine and has a gear 173 secured on its rear end. Gear 173 meshes with an idle gear 174 which in turn meshes with a gear 175. The gear 174 is thicker than gear 175 so that the teeth of gear wheel 175 may slide on the teeth of gear 174. The gear 175 carries several short pins 176, 177, and 178. The purpose of these pins is to limit the distance in which the wheel base moves at rapid speed toward work grinding position. In certain types of cam shafts it has been found desirable to have the bearing at one end larger than the bearing at the other end and with the center bearing having a diameter intermediate the diameters of the end bearings. That being the case it is desirable for the grinding wheel to move in at a high speed a greater distance for grinding the small bearing than for grinding the larger bearing. Of course it would be possible to stop the grinding wheel at the same position for all of the bearings and have the wheel move in at slow or grinding speed for the smaller and smallest bearing. This, however, would increase the time necessary for grinding bearings. By having the grinding wheel moved in to approximately the grinding position for each of the bearings the idle time necessary for grinding a bearing is reduced to a minimum. The grinding wheel base 37 is moved to grinding position by pressure fluid operating in a cylinder 178 against a piston 179 which is secured through a piston rod to the wheel base. The speed with which the wheel base may move in during grinding is controlled by a cylinder 180 and a piston 181. The cylinder 180 is filled with liquid, preferably oil and is kept full by oil from a reservoir 182. An abutting screw or pin 183 in a bracket 184 on the wheel base engages one of the short pins 176, 177, or 178. This pin in turn engages the head of the piston 181. As the wheel base is moved in by pressure applied in the cylinder 178, the movement is rapid until the screw 183 engages one of the pins which in turn engages the head of the piston 181. The feed of the wheel base at this time is checked and is limited by the rate with which oil in the cylinder 180 at the end of piston 181 may be forced up into the reservoir 182. This speed is controlled by a needle valve shown as a whole at 185. The needle valve itself is automatically controlled to further slow down movement of the wheel base as the work approaches finished size. This slowing down movement is effected by means of a solenoid 186 which is operated by current supplied through lines 237 and 238. The armature on the solenoid is connected by means of a link 189 and rock arms 190 to the outer end of the needle valve stem. By mechanism later to be described as the work approaches finished size solenoid link 189 is pulled down until the arm 190 engages the stop 191. This movement will rotate the needle valve in a clockwise direction to further throttle the flow of oil from the cylinder 180 into the reservoir 182. As stated above pins 176, 177, 178 are of different lengths. It will therefore be seen that the grinding wheel base is slowed down at different positions depending upon which of these pins is in position between the abutting screw 183 and the head of the piston 181. The position of the star wheel 169 determines which of the several pins is in position to be engaged by the abutment on the wheel base and of course the position of the star wheel is determined by the position of the work carriage. As the work carriage traverses it positions the correct pin so as to stop the fast feed of the wheel base in accordance with the size of the bearing to be ground. The wheel 175 is mounted on an arm 192 which arm is secured to or made integral with the piston 181. This piston preferably carries another arm 193 the outer end of which is notched at 194 which notch engages over a pin 195. This pin is adjustably carried by a rotatable nut 196, the outer end of which may be graduated as shown at 197. The purpose of the mechanism just described is to limit outward movement of the piston 181. If a shaft is being ground which has a great deal of stock to be removed it is necessary to permit the piston 181 to be retracted to a greater extent than when grinding bearings on which a very small amount of stock must be removed. By means of the adjusting nut 196 the operator may determine the extent of movement of the piston 181. This adjustment provides other means for eliminating lost motion on the machine.

Main control valve assembly

As shown in Figure 27 and diagrammatically in Figure 29 a main control valve operates the various elements on the machine and this valve is controlled by a work sizing device. When the work has been reduced approximately to its desired size the mercury in the contact tube closes circuit across lines 235 and 236. This closes a relay switch in box 239 to close circuit between lines 237 and 238. This energizes solenoid 186 to close needle valve 185 and slow down movement of the wheel base toward the work. When the work is reduced to finished size contact is closed between lines 236 and 240 to close another relay switch in box 239 to close circuit through lines 241 and 242. This energizes solenoid 212. The solenoid operates through armature 213, lever 214, link 215, and rock arm 216 to operate valve 217 against tension of spring 217'. This shifts valve 217 to admit pressure from line 230 and 231 to the head of piston 179 to withdraw the wheel base from the work. As the wheel base approaches the rearward limit of its travel the dog 199 mounted thereon will engage roller 200 to close switch 201. This closes a relay in box 300 which closes circuit through solenoid 198. When this solenoid becomes energized it withdraws the plunger 205 which engages in a notch 206 in the indexing bar 207 on the work carriage. When the work carriage is released it is traversed by a motor later to be described. The solenoid operates through a lever 203 which is pivoted at 204. The end of the lever 203 is attached to a valve stem 208.

Circuit across lines 236 and 240 is closed only for a short time. For as soon as the work carriage begins its traverse the valve 132 cuts off air from the sizing device. If solenoid 212 becomes de-energized the valve 217 would be shifted by spring 217' to return the wheel base to working position. Means are provided therefore to maintain circuit closed across lines 241 and 242 to keep the solenoid 212 energized. This is accomplished by means of the switch 209 which is closed when the plunger 205 is withdrawn. Closing of circuit in switch 209 energizes a relay switch in control box 239 to close circuit across lines 241, 242. The circuit in box 209 is closed by means of an arm 210 having a roller 211 which is engaged by the end of a lever 203 all as best shown in Figure 27 and diagrammatically shown in Figure 29.

A switch 264 is in circuit with the work drive motor. This switch is operated by means of an arm carrying a roller 266 engageable by a lever 265 which is operated by means of the reversing lever 226. When the reversing lever is moved to the neutral position the motor circuit through switch 264 is open and the work drive motor is stopped. The switch 264 also controls the solenoid 212 so that when the motor circuit of switch 264 is opened the circuit for energizing solenoid 212 is closed so that the wheel base will be withdrawn whenever the reversing lever 226 is moved to the neutral position. The valve 132 cuts off air supply from the sizing devices as soon as the work carriage begins to traverse. The valve 132 of course is operated by star wheel 133 which is actuated by dogs 134.

The work carriage is traversed by motors 218 in which pistons 220 operate, these pistons being connected by means of piston rods 221 with the traverse carriage. Pressure fluid for operating the piston is supplied through lines 219 and 222. Pressure fluid for operating the piston is controlled by a reversing valve 223. Pressure fluid is supplied to the valve 223 by the line 224 and is exhausted through line 225. The position of the valve 223 determines the direction of movement of the work carriage and the position of the valve 223 is determined by the reversing lever 226 which is shown in neutral position in Figures 27 and 29. Pressure fluid for operating the system is supplied through line 227 and passes from pipe 228 into the valve chamber 229 and in the position shown in Figure 29 may pass to line 224 in to the valve casing of valve 223. The reversing lever 226, however, being in neutral position both of lines 219 and 222 are cut off so that the work carriage will not traverse. Pressure fluid to the wheel base motor is supplied through the valve chamber 229 to line 230 from which it passes through pipe 231 to the cylinder 178 for operating the wheel base. This will be the position of the parts during a grinding operation.

When the work has been ground to finished size the solenoid 212 will shift the valve 217 to open the line 230 connecting it with line 232. Pressure fluid will therefore be applied to the front of the piston 179 to withdraw the wheel base and the wheel from working position.

Fluid will be exhausted through line 231 and line 233 to exhaust line 234.

Operation

The operation of the machine is as follows: Assume the parts to be in the position shown diagrammatically in Figure 29 with the reversing lever 226 in vertical position in which the control valve will be in neutral position. Assume also that a cam shaft is positioned between the head-stock and tail-stock centers and that the traverse carriage is at the right of its travel and that the locking plunger 205 is resting against the lower side of the locking bar 207 against a stop lug adjacent the notch 206. Assume also that the bearing on the left end of the cam shaft is the largest bearing, the bearing at the right end the smallest and the diameter of the intermediate bearing is intermediate the diameters of the other two bearings. The reversing lever 226 is now moved to the right to shift the reversing valve 223 to the left. Fluid under pressure is delivered through the control valve 208 from line 228 and passes through line 224 and through pipe 222 into the traverse cylinder 218 at the right of piston 220. The piston rod 221 is attached to the work carriage so the work carriage is moved to the left until locking bar 205 drops into notch 206. Movement will only be slight since the locking bar is resting against the under side of the spacing bar 207 just slightly to the left of the notch 206. When the locking plunger 205 moves up into the notch 206 the traverse valve 208 is shifted by a spring 208', being moved upwardly. Pressure fluid line 224 is therefore cut off from pressure fluid line 228. At this time wheel base control valve 217 is in position to admit pressure fluid from line 228 through line 230 and line 231 to the rear of piston 179 to move the wheel base to feed the wheel toward the work. The wheel is fed in rapidly toward the work until the abutment 183 on the wheel base engages the end of pin 176. Since the bearing on this end of the cam shaft is the largest of the bearings the pin 176 will be the longest of the three pins 176, 177, and 178. When the abutment on the wheel base engages the end of this pin the other end of the pin will engage the rear end of the piston 181. The teeth on gear wheel 175 have a sliding engagement with the teeth on gear wheel 174. To permit this the gear 174 is somewhat wider than gear wheel 175. Pressure fluid applied to the rear of the piston 179 will continue to urge the wheel base forward but its speed will be controlled by the speed with which fluid entrapped at the end of piston 181 in cylinder 180 may escape through a needle valve 185. The speed of the wheel base toward the work is now the grinding speed and the wheel base is fed in slowly. At the same time the reversing lever is moved either to the right or the left to initiate the movement of the work table, the valve 243 is shifted so as to permit fluid to flow directly to the center back rest for moving it forward into contact with the work piece and for maintaining said back rest in contact therewith during the grinding of all three of the work pieces. It also directs the fluid to the valve 132, and when the work table is positioned so that the plunger 205 will drop into the notch 206, this valve 132 will be positioned so that the fluid is directed to the back rest at the left, as viewed in Fig. 9, and the back rest will move forward into contact with the work piece and be maintained in contact therewith during the grinding of the same. At this time, the grinding wheel is positioned for grinding the work piece at the left. When the work table moves so as to position the plunger 205 opposite the notch at the right hand end of the spacing bar 207, then the valve 132 will be set so as to direct fluid to the back rest at the right-hand end and this will cause said back rest to move forward into contact with the work piece and remain in contact therewith during the grinding operation thereof.

From the above it will be apparent that the lever 226 is a manually operated lever which controls the fluid pressure means that moves the wheel support to bring the grinding wheel into contact with the work and maintain said wheel in contact therewith during the grinding operation, and it is also a control means for directing fluid to the back rest for causing the back rest to contact with the work pieces and maintain said contact during the grinding of each work piece. This insures that the back rest and the grinding wheel will be automatically controlled and operated in proper timed relation for the grinding operations. It is true that the center back rest is moved into contact with the work at the beginning of the grinding cycle and remains in contact therewith throughout the entire cycle. Nevertheless, the fluid means for operating the same is controlled by this lever 226 so that it is brought into operation automatically for the grinding cycle. When the bearing has been reduced approximately to finished size the sizing device 108, in a manner shown in the copending application referred to will cause contact to be made between wires 235 and 236. These circuits through relays in box 239 close circuit through 237 and 238 to energize solenoid 186. When these contacts are closed solenoid 186 will be energized to rotate the needle valve 185 in a clockwise direction as shown in Figure 25. This will close the needle valve a little more so as to slow down further feed of the wheel base toward the work. In fact the feed will be substantially stopped, to permit the grinding wheel to polish the work. This polishing, however, will remove a little more of the stock from the bearing, reducing its size to the finished diameter. When it has reached the desired size, as indicated, by the sizing device, again contact will be made between lines 236 and 240. This will stop further feeding of the grinding wheel and the circuit will be closed through lines 241 and 242 to energize solenoid 212 and through the links 215, 214 and rock arm 216 the wheel base control valve 217 will be reversed so that pressure fluid now will pass from line 230 through line 232 to the front of piston 179 to withdraw the grinding wheel base from grinding position. When the grinding wheel base has reached the rear limit of its travel a dog 199 on the wheel base engaging the roller 200 will close switch 201. This switch is in circuit with solenoid 198. This solenoid will therefore be energized and the left end of the arm 203 will be lifted to withdraw plunger 205 from the locking bar 207 and at the same time the traverse valve 208 will be depressed to put line 228 in communication with line 224. The reversing valve 223 is already in the position to move the traverse carriage to the left. The carriage will therefore move to the left until the locking plunger 205 engages the center notch at which time the carriage will be locked in position with the center bearing opposite the grinding wheel. As the plunger moves back into the notch the traverse valve 208 will be moved upwardly to close communication between the pressure fluid line 228 and fluid line 224. Wheel base control valve 217 will also be shifted to admit fluid through pressure fluid line 230 to pressure fluid line 231 to the rear of piston 179 to start movement of the grinding wheel base toward the work again. As the grinding wheel reaches a position at which it will begin grinding stock from the bearing the abutment 183 will engage the head of the center pin 177 to stop rapid feed of the wheel base for grinding the center bearing. As the work carriage moves to position the intermediate bearing opposite the grinding wheel the control valve 132 shown in Figures 12 to 18 is also moved as the star wheel 133 comes into engagement with the dog 134. This rotates the control valve to the position to admit air to the sizing device on the center back rest and to admit pressure fluid to the piston to move the sizing device to work sizing position. In the case of the sizing device on the back-rest 83 at the end of the cam shaft the sizing device was moved in along with the back rest. The sizing device on the center back-rest, however, is moved independently of movement of the back-rest for this back-rest is held in work engaging position as long as foot-stock is engaged. The sizing device, however, is moved to engage the center bearing only when the grinding wheel is moved up to grind the center bearing. The end back-rests are fed in toward the work at a speed exactly in proportion to the speed in which the grinding wheel is fed toward the work, i. e. the needle valve 107 is set exactly at the same setting as the needle valve 185 which controls the feed in of the wheel base. The back-rest therefore will be kept in contact with the work as the work is reduced in size. This prevents any swinging outwardly of the cam shaft and therefore prevents any distortion of the bearing which is being ground. The feed-in arrangement just described applies to the end bearings for all are fed in as the work is reduced in size. When the center bearing has been ground to finished size the wheel base will be withdrawn in the same way in which it was withdrawn when the left end bearing was ground and the work carriage will be traversed to position the right end bearing on the cam shaft and the wheel will be brought in to grind this bearing in the same way it was brought in for the other two. When this bearing has been ground to finished size the wheel will be withdrawn and the work carriage moved until the locking plunger strikes the stop lug at the right end of the locking bar at which time the cam shaft may be moved from the machine and another cam shaft placed in position. In order to release the cam shaft the lever 226 is moved to neutral position. Pressure fluid is applied directly from pressure fluid line 227 through the valve 243 into the head-stock and foot-stock cylinders. The foot-stock is withdrawn against the tension of spring 46. Pressure applied to piston 68 withdraws the work driving arm 77 out of engagement with the work, the lug 82 being withdrawn from the key slot in the end of the cam shaft. So long as pressure is applied to the head-stock and foot-stock cylinders the work engaging means permits free removal of the work and insertion of another piece to be ground. When the new shaft is positioned between the head stocks the reversing lever 226 is moved to the left, valve 243 moves upwardly and permits fluid to escape from the foot-stock and head-stock cylinders so that springs 46 and 70 again become effective for gripping the work. There is a resistance unit 261 allowing the driver to come in slowly insuring work being on centers before the driver engages, check valve 262 allowing driver to be released immediately. The reversing valve 223 is now shifted as will be seen to put pressure fluid line 224 in communication with line 219 to admit pressure fluid to the left side of piston 220 to move the work carriage to the right. The first movement brings the work carriage to the position where the locking plunger will engage the notch on the right end of the locking bar and holds the work carriage in position to grind the bearing at the right end of the cam shaft. This is the smallest bearing on the shaft. The wheel base therefore will move in as will be seen until the abutment 183 strikes the end of pin 178. This is the shortest of the three pins. The wheel base therefore will move in further than with either of the other two pins between the abutment 183 and the head of piston 181. The grinding will proceed now with the work carriage moving from left to right until the center and left bearings have been ground at which time the reversing lever 226 will be moved to neutral position again. The work will be removed and the grinding proceeded through the cycles again. At 264 is shown a double circuit limit switch which is in circuit with the work drive motor 35 and wheel base infeed solenoid 212. When the reversing lever 226 is in the neutral position shown in Figure 27 it moves the lever 265 to engage the roller 266 and open the switch 264 so that rotation of the work will be stopped, and grinding wheel will be withdrawn.

It will be obvious to those skilled in the art that various changes may be made in our device without departing from the spirit of the invention and therefore we do not limit ourselves to what is shown in the drawings and described in the specification, but only as indicated by the appended claims.

We claim:

1. A machine for grinding each of a plurality of bearings of a cam shaft comprising a wheel base having a grinding wheel mounted thereon, a work carriage traversable at right angles to the plane of the grinding wheel, a back-rest on said work carriage, opposite each of the bearings to be ground, means for moving the wheel base toward and from the work, and means for moving the back-rest which is in the plane of the grinding wheel into engagement with the work, and means for effecting a movement of the back-rest synchronized with the feeding-in of the wheel base as the work is reduced in size thereby maintaining a constant pressure of the back-rest upon the work, substantially as set forth.

2. In a grinding machine having a wheel base and a grinding wheel mounted thereon, a plurality of back-rests for supporting the work against the thrust of the wheel, and automatic means for moving each of said back-rests singly toward the work at a speed proportional to the feeding-in of the grinding wheel during grinding operations whereby the work is supported by the same pressure at all times as the work is reduced in diameter, substantially as set forth.

3. In a grinding machine, means for grinding successively each of the bearings on a cam shaft having bearings of different diameters comprising a wheel base having a grinding wheel mounted thereon, pressure fluid means for moving the wheel base toward the work at high speed, separate pressure fluid means for reducing the speed to a slow grinding speed as the grinding wheel reaches approximate grinding position, electrically controlled means actuated upon a reduction of the work to finished size for stopping the feeding-in movement of and for initiating withdrawal of the said wheel base, and means operated in timed relation with withdrawal of the wheel base for setting in motion mechanism for traversing the work to position another bearing in the plane of the grinding wheel, substantially as set forth.

4. In a grinding machine, means for grinding successively each of the bearings on a shaft having portions of different diameters comprising a wheel base having a grinding wheel mounted thereon, a work support, a plurality of back-rests mounted thereon, a sizing device mounted thereon adjacent each back-rest, pressure fluid means for moving the wheel base toward the work at high speed, separate pressure fluid means for reducing the speed to a finishing speed, electrically controlled means actuated upon a reduction of the work to finished size for stopping the feeding-in movement of and for initiating withdrawal of the said wheel base, means operated in timed relation with withdrawal of the wheel base for setting in motion mechanism for traversing the work to position another bearing in the plane of the grinding wheel, and means operated in timed relation with the movement of the work to the plane of of the grinding wheel for moving back-rests and work sizing devices into operable relationship with the bearing to be ground, substantially as set forth.

5. In a machine for grinding several portions of a shaft, the combination with a grinding wheel base movable toward and from working position, a work carriage traversable to bring the various portions into operative relation to the grinding wheel, of a plurality of back-rests and work sizing devices, and means controlled by the sizing devices for operating the wheel base and the back-rests and for traversing the said shaft to position the several portions in the plane of the grinding wheel, substantially as set forth.

6. In a grinding machine, a grinding wheel, a work carriage, means to cause a relative traverse movement between said carriage and said wheel, a plurality of back rests mounted on said carriage, sizing devices mounted on and movable with each back-rest, pressure fluid means to move the back-rests to operative position, and means operated by movement of the carriage for controlling said pressure fluid, substantially as set forth.

7. A machine for grinding a work piece having a plurality of portions of different diameters comprising a wheel base, a work carriage, means to cause a relative traverse movement between the wheel base and work carriage, fluid operated sizing devices for measuring each of said portions and means operated by movement of the said carriage for controlling the supply of fluid to the said sizing devices, substantially as set forth.

8. In a grinding machine having a grinding wheel movable toward and from grinding position, a work carriage movable at right angles to the plane of the grinding wheel, a plurality of back-rests mounted on said carriage, a fluid operated sizing device mounted on and movable with each of the back-rests, pressure fluid means for operating the back-rests to move them to work supporting position, a separate pressure fluid means for operating the sizing devices, and means for limiting the speed of movement of the back-rest toward work engaging position to the speed of movement of the grinding wheel toward the work whereby the pressure of the back-rest on the work will be constant as the work is reduced in diameter by the grinding wheel, substantially as set forth.

9. In a machine for grinding the bearings on a cam shaft in which the bearings are all of different diameters, a work carriage having means mounted thereon for supporting the cam shaft, a wheel base having a grinding wheel mounted thereon, means for moving the wheel base at high speed from the work and for returning it at high speed to the work, means for changing the high speed to grinding speed, and means controlled by movement of the work carriage for changing the position at which the high speed is changed to low speed, said change being in proportion to the diameter of the bearing to be ground so that the wheel base will move in at high speed further when grinding the smallest bearing than it will when grinding the largest bearing thereby reducing the time necessary to grind the bearings on the cam shaft, substantially as set forth.

10. A machine of the kind described for grinding each of a plurality of bearings on a shaft comprising a wheel base having a grinding wheel mounted thereon, a work carriage traversable at right angles to the plane of the grinding wheel, a backrest on said work carriage, opposite each of the bearings to be ground, means for moving the wheel base toward and from the work, and means for moving the backrest which is in the plane of the grinding wheel into engagement with the work, and means for effecting a movement of the backrest synchronized with the feeding-in of the wheel base as the work is reduced in size thereby maintaining a constant pressure of the backrest upon the work, substantially as set forth.

11. In a machine of the kind described for grinding bearings on a shaft in which the bearings are of different diameters, a work carriage having means mounted thereon for supporting the shaft, a wheel base having a grinding wheel mounted thereon, means for moving the wheel base toward and from the work, means for controlling said moving means to obtain a grinding feed, and means actuated by movement of the work carriage for changing the position at which said control means initiates the grinding feed, said change being in proportion to the diameter of the bearing to be ground so that the wheel base will move in at high speed further when grinding the smallest bearing than it will when grinding the largest bearing thereby reducing the time necessary to grind the bearings on the shaft, substantially as set forth.

12. A grinding machine of the kind described having a work support, a grinding wheel and a wheel support, means to provide relative longitudinal and transverse movement between said supports to successively place the grinding wheel and selected portions of the work piece in operative relation and to provide a grinding feed respectively, normally inoperative means for sizing each portion of the work, means controlled by the longitudinal movement to successive positions to move each of said sizing devices to operative position only when the corresponding portion of the work is in operative relation with the grinding wheel, and means whereby each of said sizing devices controls the relative movements of the work support and the wheel support, substantially as set forth.

13. In a machine of the kind described, a grinding wheel support, a work support, fluid means to provide relative transverse and longitudinal movement between said supports, sizing devices on one of said supports and adapted to be moved toward and from operative relation with a plurality of selected portions of a work piece, means responsive to a change in size of one of said portions to actuate the corresponding sizing device to effect said transverse movement and said longitudinal movement, substantially as set forth.

14. In a machine of the kind described, a wheel support, a work support, fluid means to provide relative transverse and longitudinal movement between said supports, a series of sizing devices mounted on said work support and adapted to cooperate with a plurality of selected portions of a work piece, and means responsive to each of said sizing devices to initiate said longitudinal movement to bring said wheel and another of said portions into grinding relation, substantially as set forth.

15. In a machine of the kind described, a work support, a wheel support, fluid means to provide a relative transverse and longitudinal movement between said supports, a plurality of sizing devices mounted on said work support, and adapted to engage selected portions of a work piece, fluid means to move said sizing devices toward operative position, means responsive to a change in size of one of said portions to set in operation the fluid for effecting said longitudinal movement and means responsive to said movement to cause withdrawal of one of said sizing devices and to cause another to be moved to operative position, substantially as set forth.

16. In a machine of the kind described, a pair of supports, fluid means to provide a relative transverse and longitudinal movement between said supports, sizing devices on one of said supports adapted to cooperate with selected portions of a work piece, a spacing bar on one of said supports having notches corresponding to said portions, a plunger to engage said notches to locate said support accurately in working position, and means responsive to any one of said sizing devices for withdrawing said plunger, substantially as set forth.

17. In a machine of the kind described, a pair of support members, fluid means to provide relative transverse and longitudinal movement between said members, a plurality of sizing devices mounted on one of said members in operative relation with selected portions of a work piece, a spacing bar on one of said members having notches corresponding to said selected portions, a plunger adapted to successively engage said notches to locate said portions accurately in work position, means actuated by any of said sizing devices in response to a change in size of the corresponding portion of the work piece to cause withdrawal of said plunger, and means responsive to withdrawal of said plunger to direct fluid to the fluid means for actuating said member, substantially as set forth.

18. In a machine of the kind described, a pair of supports or carriages, fluid means to provide a relative transverse and longitudinal movement between said supports, a spacing bar adjustably mounted on one of said supports, notches in said bar spaced to correspond to selected portions on a work piece, precision means to adjust said bar relative to said support, a plunger adapted to enter said notches to locate said support in each of several grinding positions, and means responsive to a change in size of a work piece to withdraw said plunger, substantially as set forth.

19. In a machine of the kind described, a work support, a wheel support, fluid means to move one of said supports relatively longitudinally of the other, a plurality of sizing devices mounted on said support and adapted to engage selected portions of a work piece, means to render each of said sizing devices sensitive to a change in size of the corresponding portion, and means responsive to said longitudinal movement to supply said sensitizing means to each sizing device when the corresponding portion is moved into grinding position.

20. A machine of the kind described comprising a work support, a wheel support, fluid means to provide a relative transverse and longitudinal movement of said supports, means to effect said longitudinal movement intermittently to place the grinding wheel and a plurality of selected portions of a work piece in operative relation, individual sizing devices for each portion, means responsive to the sizing device in cooperation with the portion being ground to effect movements of said supports, substantially as set forth.

21. In a machine of the kind described a work support, a wheel support, automatic means to provide relative transverse and longitudinal movement between said supports, means to effect said longitudinal movement intermittently to bring the grinding wheel and a plurality of selected portions of a work piece into grinding relation, a sizing device adapted to be placed in operative relation with each of said portions and means effected by each of said sizing devices responsive to a change in size of the corresponding portion to initiate movement of one of said supports, means responsive to said movement to effect movement of the other support, and means to vary the speed of one of said movements regardless of the other.

22. In a machine of the kind described, a work support, a wheel support, automatic means to provide a relative transverse and longitudinal movement of said supports, means to effect said longitudinal movement intermittently to bring a grinding wheel and a plurality of selected portions of a work piece into grinding relation, means to grind each of said portions to size automatically and means to vary the size of any one portion independently of the others comprising a sizing device positioned adjacent each of the said portions and adapted to control grinding of said portions.

23. In a machine of the kind described, a pair of supports, fluid means to provide relative movements of said supports, means to effect one of said movements intermittently to bring a tool and a plurality of work pieces into operative relation, automatic means responsive to a change in size of one of said work pieces to effect a separation of said supports and thereafter to effect said intermittent movement, substantially as set forth.

24. In a grinding machine, a work support, a wheel support, a back rest for supporting the work against the thrust of the grinding wheel, automatic means to move said back rest toward the work at a speed proportional to the feeding movement of the grinding wheel, and means to change the speed of movement of said back rest to correspond to changes in the rate of wheel feed, substantially as set forth.

25. In a grinding machine, a work support, a wheel support, a back rest for supporting the work against the thrust of the grinding wheel, automatic means for moving said back rest at high speed toward the work, and means to reduce said high speed to a speed corresponding to the feed of the grinding wheel, substantially as set forth.

26. In a grinding machine, a work support, a wheel support, a back rest for supporting the work against the thrust of the grinding wheel, automatic means for moving said back rest at a rapid speed toward the work and for reducing the rate of movement thereof to correspond to the feeding movement of the grinding wheel, and means for adjusting the position at which the movement of the rest is changed.

27. In a machine of the kind described, a wheel support, a work support, fluid means to provide a relative transverse and longitudinal movement between said supports, a plurality of back rests mounted on said work support, fluid means to move said back rests to operative position, and means for limiting the speed of the back rest toward work engaging position to the speed of said transverse movement, whereby the pressure of the work rest on the work will be constant as the work is reduced in diameter by the grinding wheel, substantially as set forth.

28. In a machine of the kind described, a work support, a back rest mounted on said work support, fluid means for moving said back rest at high speed toward the work and fluid means to reduce said high speed to a feeding speed as said rest approaches said work, substantially as set forth.

29. A grinding machine of the kind described having a work carriage, a grinding wheel movable toward and from said carriage, means to traverse said carriage intermittently past the grinding wheel to successively place a plurality of portions of a work piece in grinding position, normally inoperative means for sizing each portion, means controlled by movement of the carriage to successive positions to move said sizing devices to operative position when the corresponding portion of the work piece is in grinding position, and means whereby each of said sizing devices controls the movement of the wheel base and work carriage, substantially as set forth.

30. A grinding machine of the kind described having a work support, a grinding wheel and a support for said grinding wheel, means to provide relative longitudinal and transverse movements between said supports to successively place the grinding wheel and selected portions of the work piece in operative relation, and to provide a grinding feed, normally inoperative means for sizing each portion of the work, means controlled by the longitudinal movement to successive positions to render each of said sizing devices operative only when the corresponding portion of the work is in operative relation with the grinding wheel, substantially as set forth.

31. A machine for grinding shafts having two or more bearings, comprising a work support, a wheel support, means for moving said supports relative to each other to position each of the bearings successively in position to be ground, a back rest upon the work support adjacent each of the bearings on the shaft, and means for moving each of the back rests into engagement with the bearing as the work support is traversed to bring said bearing into grinding position and means controlled by movement of the work support for determining which of said backrests is moved into engagement with the adjacent bearing, substantially as set forth.

32. A machine for grinding shafts having three or more bearings comprising a support for a grinding wheel, a grinding wheel mounted thereon, a work support, means for rotatably supporting the said shaft upon the work support, a back rest on the work support adjacent each of the bearings to be ground, means for moving the end back rests into work engaging position as the adjacent bearing is brought into grinding position with the grinding wheel, means for maintaining the back rest intermediate the ends of the shaft at all times in work engaging position, a sizing device positioned on the work support adjacent each of the bearings to be ground, and means for moving each sizing device into work engaging position as the adjacent bearing is brought to grinding position before the grinding wheel, substantially as set forth.

33. In a machine of the kind described, a work carriage, a wheel base, means to provide relative transverse and longitudinal movement between said parts, a plurality of sizing devices normally in inoperative position, a plurality of back rests also normally remote from operative position, a plurality of stops for the wheel base movement and means responsive to movement of said carriage to move said sizing device, back rests and the wheel base to grinding position and to successively position the several stops to stop said wheel base in each of several positions corresponding to the diameters of the work to be ground, substantially as set forth.

34. In a machine of the kind described, a wheel support, a work support, means to provide relative longitudinal movement between said supports, fluid means to effect relative transverse movement between said supports, means for controlling said fluid means to obtain a grinding feed, and means actuated by the relative longitudinal movement of the supports for changing the position at which said control means initiates the grinding feed.

35. In a machine of the kind described, a wheel support, a work support, means to provide relative longitudinal movement between said supports, means to effect relative transverse movement between said supports, means to control said transverse moving means to obtain a grinding feed, and a plurality of stops positioned by the relative longitudinal movement of said supports for changing the position at which said control means initiates the grinding feed.

36. In a grinding machine, a work carriage, a wheel support, a headstock and tailstock on said carriage, an automatic work driver on said headstock, an automatic center on said tailstock, a hydraulically actuated back rest, a fluid motor to drive said carriage, a valve to control the supply of fluid to said driver, tailstock and back rest, another valve to determine the direction of movement of said carriage, fluid means to actuate said wheel support, a valve in control of said means, an electric motor to drive said headstock, and a common control for said electrical devices and said fluid operated devices, substantially as set forth.

37. In a machine of the kind described, a wheel support, a work support, means to provide relative transverse and longitudinal movement between said supports, fluid pressure means to provide said movements, a headstock, fluid means on said head stock to engage and rotate a work piece, a foot stock on said work support, a center on said foot stock, fluid means to move said center, a plurality of fluid operated back rests and sizing devices mounted on said work support, a distributing valve to control the flow of fluid to said elements, a back rest operable independently of said other back rests, a reversing valve to control the direction of said longitudinal movement, means to actuate said reversing valve, said means being utilized also to control the flow of fluid to said distributing valve, footstock center, back rest, and work rotating means, and to start and stop said head stock drive, substantially as set forth.

38. In a machine of the kind described, a wheel support, a work support, fluid means to provide relative transverse and longitudinal movement between said supports, a reversing valve to control the direction of one of said movements, means to actuate said valve, means to set said actuating means in any one of three positions, additional fluid operated means on said machine, a valve to control the supply of fluid to said additional means, an electrically operated device on said machine, a switch to start and stop said device, means to utilize the means to actuate said reversing valve to actuate said control valve and said switch, and means whereby said means to actuate the reversing valve causes said fluid means and said electrical means each to perform a given operation in either of two positions of said actuating means and to perform another operation in said third position, substantially as set forth.

39. In a machine of the kind described, a wheel support, a work support, fluid means to provide a relative transverse and longitudinal movement between said supports, a head stock on said work support, a fluid operated work driver on said head stock, a foot stock on said support, a fluid operated foot stock center in said foot stock, a valve to direct fluid to each of said devices, a valve to determine the direction of said longitudinal movement, and a common control for said valves, substantially as set forth.

40. In a machine of the kind described, a wheel support, a work support, fluid means to provide a relative transverse and longitudinal movement between said supports, a head stock on said support, means to drive said head stock, a fluid operated work driver on said head stock, a reversing valve for the fluid for said longitudinal movement and a common control means for said valve, work driver and head stock drive.

41. In a machine of the kind described, a wheel support, a work support, means to reciprocate said work support, a back rest adapted to be moved to support a work piece during a grinding operation, fluid means to move said back rest, a valve in control of said fluid means, a lever in control of said reciprocating means said lever serving also to operate said valve, substantially as set forth.

42. In a machine of the kind described a wheel support, a work support, means to provide relative longitudinal and transverse movement between said supports, means to effect said transverse movement at high speed, means to reduce said high speed to grinding speed, comprising a hydraulic feed regulator and a plurality of stops varying in size and adapted to be selectively positioned to engage said feed regulator, substantially as set forth.

43. In a machine of the kind described, a work support, a wheel support, fluid means to provide a relative transverse and longitudinal movement of said supports, a spacing bar on one of said supports, an element adapted to coact with selected portions of said bar and means responsive to movement of the other support to withdraw said element from said bar, substantially as set forth.

44. In a machine of the kind described, a work carriage, a footstock on said carriage, fluid means to actuate said footstock to engage a work piece, a back rest adapted to engage and support a work piece, fluid means to actuate said back rest, and means whereby fluid pressure is directed first to the footstock operating means and then to the back rest operating means.

45. In a machine of the kind described, a pair of supports or carriages, fluid means to provide a relative transverse and longitudinal movement between said supports, a spacing bar mounted on one of said supports, notches in said bar spaced to correspond to selected portions on a work piece, a plunger adapted to enter said notches to locate said support in each of several grinding positions, and means responsive to a change in size of a work piece to withdraw said plunger.

46. In a machine of the kind described, a work support, a tool support, and a tool carried thereby, mechanism to provide relative intermittent longitudinal movement between said supports to successively place said supports in a series of different operating positions, mechanism to provide a relative transverse movement of one of said supports toward and from the other, a sizing device contacting with the work, and mechanism actuated by the sizing device when the work reaches a predetermined size to initiate said movements.

47. In a machine of the kind described, a work support, a tool support, and a tool carried thereby, mechanism to provide relative intermittent longitudinal movement between said supports to successively place said supports in a series of different operating positions, mechanism to provide a relative transverse movement of one of said supports toward and from the other, a sizing device contacting with the work, and mechanism actuated by said sizing device in response to a predetermined change in size of the work to separate said supports and to place said tool support in another operating position relative to the work support.

48. In a machine of the kind described, a work support, a tool support, and a tool carried thereby, mechanism to provide relative intermittent longitudinal movement between said supports to successively place said supports in a series of different operating positions, mechanism to provide a relative transverse movement of one of said supports toward and from the other, a sizing device contacting with the work, and mechanism actuated by said sizing device in response to a predetermined change in size of the work to separate said supports and to place said tool support in another operating position relative to the work support, said transverse moving mechanism being actuated automatically to thereafter move said supports toward each other.

49. In a machine of the character described, a work support, a wheel support, a grinding wheel mounted thereon, a back rest, fluid means for moving the back rest into contact with the work piece and maintaining the contact during the grinding operation, fluid means for moving the wheel support for causing the grinding wheel to contact with the work piece and for maintaining said wheel in contact therewith during the grinding operation, a manually operable lever and means actuated thereby for controlling the supply of fluid to the means for moving the back rest and means actuated thereby for controlling the supply of fluid to the means for operating the wheel support whereby said back rest and said wheel support may be moved in proper timed relation.

50. In a grinding machine, a work carriage, a wheel support, a grinding wheel mounted thereon, means for operating the wheel support for the grinding operation, a head stock and a tail stock on said carriage, a work driver on the head stock, a movable center on said tail stock, a back rest, means for moving the back rest into engagement with the work piece, a sizing device, means for moving said sizing device into operative position, and a control means common to all of said elements for operating the same in a predetermined timed relation to the grinding operation.

51. In a grinding machine, a work carriage, a wheel support, a grinding wheel mounted thereon, fluid means for operating the wheel support for the grinding operation, a head stock and tail stock on said carriage, a fluid operated work driver on said head stock, a fluid actuated center on said tail stock, a back rest, fluid means for moving said back rest into engagement with the work piece, a sizing device, fluid means for moving said sizing device into operating position, and a control means common to all of said fluid actuated elements for operating the same in a predetermined timed relation to the grinding operation.

52. In a grinding machine, a work carriage, a wheel support, a grinding wheel mounted thereon, means for imparting a transverse movement to one of said supports relative to the other, means for imparting a longitudinal movement to one of said supports relative to the other for positioning the work and grinding wheel for successively grinding a series of spaced portions on said work and means responsive to a change in the size of the respective work portions for controlling said transverse and longitudinal movements.

53. In a grinding machine, a work carriage, a wheel support, a grinding wheel mounted thereon, means for imparting a transverse movement to one of said supports relative to the other, means for imparting a longitudinal movement to one of said supports relative to the other, a spacing device having spacing members corresponding to selected portions to be ground on the work piece, means cooperating with said spacing members to locate the work in each of the several grinding positions, and means responsive to a change in the size of the work piece for automatically controlling said transverse and longitudinal movements.

54. In a machine of the kind described, a work support, a wheel support, means to provide a relative transverse and longitudinal movement between said supports, a plurality of sizing devices adapted to engage selected portions of a work piece, means to move the sizing devices toward operative position, and means responsive to a change in size of one of said portions to set into operation the means for effecting withdrawal of one of said sizing devices and to cause another to be moved to operative position.

55. In a machine of the kind described, a work support, a wheel support, means to provide a relative transverse and longitudinal movement between said supports, a plurality of back rests adapted to engage selected portions of the work piece, means for moving the back rests into and out of contact with the work piece, and means responsive to a change in the size of one of said portions to set in operation means for advancing the back rests into engagement with another work portion.

56. In a grinding machine, a work carriage, a rotatable work holder mounted thereon, a grinding wheel support, a rotatable grinding wheel mounted thereon, a reversible feeding mechanism for moving the grinding wheel support toward and from the work, mechanism for moving the work carriage for automatically positioning a series of portions on a work piece for successive grinding operations, mechanism for sizing the several portions to be ground, said sizing mechanism being normally in inoperative position, and means for automatically rendering the sizing mechanism operative upon the work portion being ground for controlling the feed of the grinding wheel support and for initiating the movement of the carriage.

57. In a grinding machine, a work carriage, a rotatable work holder mounted thereon, a grinding wheel support, a rotatable grinding wheel mounted thereon, a reversible feeding mechanism for moving the grinding wheel support toward and from the work, mechanism for moving the work carriage for automatically positioning a series of portions on a work piece for successive grinding operations, mechanism for sizing the several portions to be ground, said sizing mechanism being normally in inoperative position, and means for automatically rendering the sizing mechanism operative upon the work portion being ground for controlling the feed of the grinding wheel support and for initiating the movement of the carriage, said carriage operating in its movement to return said sizing mechanism to said normal position.

CONRAD L. OTT.
HAROLD E. BALSIGER.